US008929602B2

(12) United States Patent
Ding et al.

(10) Patent No.: US 8,929,602 B2
(45) Date of Patent: Jan. 6, 2015

(54) COMPONENT BASED CORRESPONDENCE MATCHING FOR RECONSTRUCTING CABLES

(71) Applicant: Seiko Epson Corporation, Tokyo (JP)

(72) Inventors: Yuanyuan Ding, Santa Clara, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 178 days.

(21) Appl. No.: 13/756,003

(22) Filed: Jan. 31, 2013

(65) Prior Publication Data

US 2014/0211989 A1  Jul. 31, 2014

(51) Int. Cl.
*G06K 9/62* (2006.01)
*G06T 7/00* (2006.01)

(52) U.S. Cl.
CPC .............. *G06K 9/6211* (2013.01); *G06T 7/004* (2013.01)
USPC ........................................................ 382/103

(58) Field of Classification Search
None
See application file for complete search history.

(56) References Cited

U.S. PATENT DOCUMENTS

2008/0181534 A1  7/2008  Toyoda et al.
2010/0328311 A1  12/2010  Lakshmanan et al.

FOREIGN PATENT DOCUMENTS

| CN | 101627280 A | * | 1/2010 | |
| EP | 1983484 A1 | * | 10/2008 | G06K 9/00 |
| GB | 2492907 A | * | 1/2013 | |
| WO | WO 2011105522 A1 | * | 9/2011 | |

OTHER PUBLICATIONS

Hierarchical Stereo Correspondence using Features of Gray Connected Components. Yang Wang and Prabir Byhattacharya. IEEE 1997.*
Wang, Y., et al., "Hierarchial stereo correspondence using features of gray connected components", Proceedings of the 1997 International Conference on Image Processing (ICIP '97), vol. 3, pp. 264-267, Oct. 26-29, 1997.
Pritchett, P., et al., "Matching and Reconstruction from Widely Separated Views", Lecture Notes in Computer Science, 1998, vol. 1506, pp. 78-92, 1998.
Felzenszwalf, P., et al., "Efficient Graph-Based Image Segmentation", International Journal of Computer Vision, vol. 59, Issue 2, pp. 167-181, 2004.
Bibby, C., et al., "Fast Feature Detection with a Graphics Processing Unit Implementation", Active Vision Group Publications, Proceedings of the International Workshop on Mobile Vision, 2006.
Hedau, V., et al., "Matching Images Under Unstable Segmentations", IEEE Conference on Computer Vision and Pattern Recognition, (CVPR 2008), pp. 1-8, Jun. 23-28, 2008.

* cited by examiner

*Primary Examiner* — Stephen R Koziol
*Assistant Examiner* — Delomia Gilliard

(57) ABSTRACT

In a stereoscopic pair of images, global homography at the image level is applied to feature points extracted from connected components (CC) to identify corresponding CC's and feature points, and to discard any CC's that do not have a corresponding pair in the stereoscopic pair of images. Local homography at the CC level is then applied to individual footprint areas of the previously identified paired CC to further clean feature point correspondence. Any CC or feature point or pixel within a paired CC footprint not satisfying local homography constraint is discarded. A correspondence is also extrapolated between unknown pixels within a paired CC footprint using a weighing mechanism and the unknown pixel's surrounding pixels that do have a known correspondence. This provides a dense correspondence of pixels, or feature points, which is then used to create a dense 3D point cloud of identified objects within a 3D space.

20 Claims, 19 Drawing Sheets

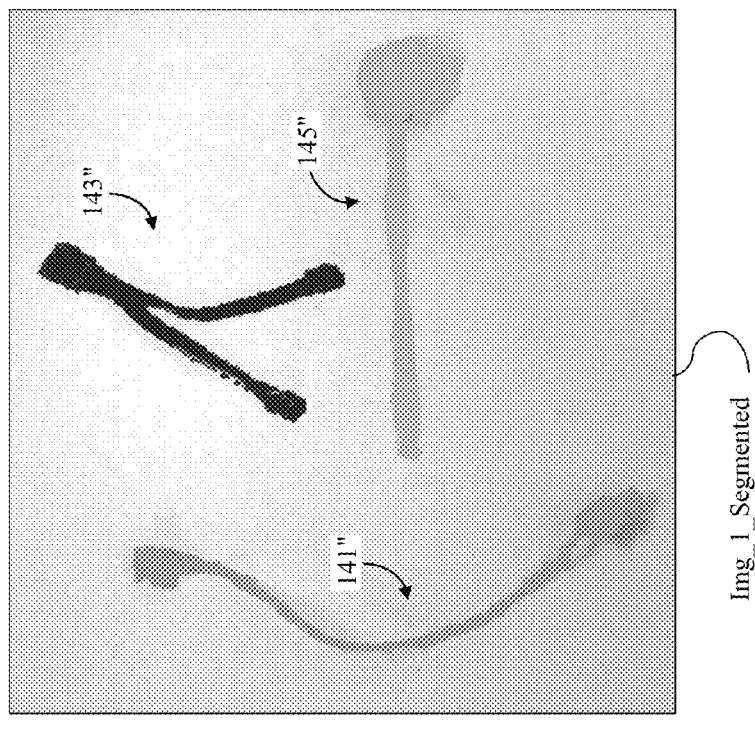
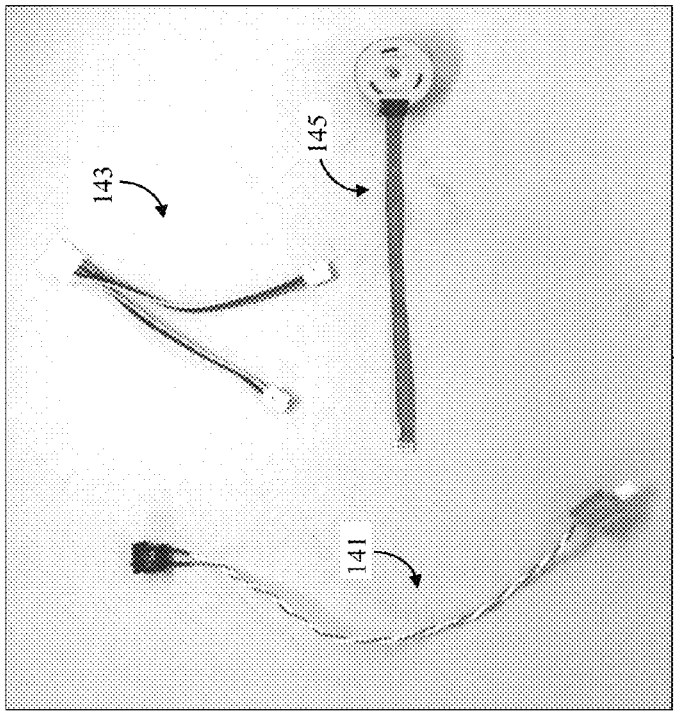
FIG. 18

COMPONENT BASED CORRESPONDENCE MATCHING FOR RECONSTRUCTING CABLES

BACKGROUND

1. Field of Invention

The present invention is directed to the field of object recognition in digital images. More specifically, it is directed towards the field of stereo computer vision and the recognition of specific target objects (or classes of objects) and their relative positions/orientations in a pair of stereoscopic images.

2. Description of Related Art

In the field of computer vision, it is generally desirable that an image not only be captured, but that a computer be able to identify and label various features within the captured image. Basically, a goal of computer vision is for the computer to duplicate the abilities of human vision by electronically perceiving and understanding the contents of a captured image. This involves extracting symbolic information from image data using models constructed with the aid of geometry, physics, statistics, and learning theory. Thus, the field of computer vision includes methods for acquiring, processing, analyzing, and gleaning an understanding of imaged objects, in order to form decisions.

Computer vision has been used and applied to a large range of fields. Applications range from machine vision in industrial systems (where for example, a computer may inspect products on an assembly line or aid in the assembly of the products themselves), to human recognition, to research into artificial intelligence in an attempt for the computer to comprehend the world around it.

Various approaches to identifying features within a captured image are known in the industry. Many early approaches centered on the concept of identifying shapes. For example, if a goal was to identify a specific item, such as a wrench or a type of wrench, then a library of the different types of acceptable wrenches (i.e. examples of "true" wrenches) would be created. The outline shapes of the true wrenches would be stored, and a search for the acceptable shapes would be conducted on a captured image. Shapes within a captured image might be identified by means of a segmentation process where the outline of foreground objects is differentiated from an image's background. This approach of shape searching was successful when one had an exhaustive library of acceptable shapes, the library was not overly large, the subject of the captured images did not deviate from the predefined true shapes, and the background was not overly complicated.

For complex searches, however, this approach is not effective. The limitations of this approach become readily apparent when the subject being sought within an image is not static, but is prone to change. For example, cable harnesses have definite characteristics, but may take many different shapes and arrangements due to their wiring lacking a rigid structure. As another example, a human face has definite characteristics, but does not have an easily definable number of shapes and/or appearance it may adopt. It is to be understood that the term appearance is herein used to refer to color and/or light differences across an object, as well as other surface/texture variances. The difficulties in understanding a human face becomes even more acute when one considers that a human face is prone to shape distortion and/or change in appearance within the normal course of human life due to changes in emotion, expression, age, etc. It is self-apparent that compiling an exhaustive library of human faces, or any non-rigid or amorphous object, and their many variations is a practical impossibility. Thus, statistical methods have been developed to address these difficulties.

Developments in image recognition of objects that change their shape and appearance, are discussed in "Statistical Models of Appearance for Computer Vision", by T. F. Cootes and C. J. Taylor (hereinafter Cootes et al.), Imaging Science and Biomedical Engineering, University of Manchester, Manchester M13 9PT, U.K. email: t.cootes@man.ac.uk, http://www.isbe.man.ac.uk, Mar. 8, 2004, which is hereby incorporated in its entirety by reference.

As Cootes et al., explain, in order for a machine to be able to understand what it "sees", it must make use of models that describe and label the expected structure being imaged. In the past, model-based vision has been applied successfully to images of man-made, rigid objects having limited and known variations. Model-based vision, however, has proven more difficult in interpreting images of non-rigid object having unknown variations, such as images of natural subjects, which tend to be complex and variable. A problem is the variability of the subject being examined. To be useful, a model needs to be specific, that is, it should represent only true examples of the modeled subject. The model, however, also needs to be general and represent any plausible example (i.e. any possible true example) of the class of object it represents.

Recent developments have shown that this apparent contradiction can be handled by statistical models that can capture specific patterns of variability in shape and appearance. It has further been shown that these statistical models can be used directly in image interpretation.

To facilitate the application of statically models, subjects to be interpreted are typically separated into classes. This permits the statistical analysis to use prior knowledge of the characteristics of a particular class to facilitate its identification and labeling, and even to overcome confusion caused by structural complexity, noise, or missing data.

Additionally, in order to facilitate further processing of identified and labeled subjects within a captured image, it is beneficial for the identified subject to be transformed into (i.e. be fitted onto) a predefined, "model" shape with predefined locations for labeled items. For example, although the human face may take many shapes and sizes, it can be conformed to a standard shape and size. Once conformed to the standard shape and size, the transformed face can then be further processed to determine its expression, determine its gaze direction, identify the individual to whom the face belongs, etc.

A method that uses this type of alignment is the active shape model. With reference to FIG. 1, the active shape model uses a predefined model of a class of object, such as human face 1A in the present example, and a list of predefined deformation parameters, each having corresponding deformation constraints, to permit the predefined model to be stretched and move to attempt to align it with a subject image 2. Alternatively, the list of predefined deformation parameters may be applied to subject image 2, and have it be moved and deformed to attempt to align it with the predefined model 1A. This alternate approach has the added benefit that once subject image 2 has been aligned with the predefined model 1A, it will also be fitted to the shape and size of the predefined model 1A, which facilitates the identifying of individual parts of the subject image 2 in accordance with labels on the predefined model 1A.

For illustrative purposes, FIG. 1 shows predefined model (i.e. model face) 1A being fitted to subject image (i.e. subject face) 2. The example of FIG. 1 is an exaggerated case for illustration purposes. It is to be understood that a typical model face 1A would have constraints regarding its permissible deformation points relative to other points within itself. For example, if aligning the model face meant moving its left eye up one inch and moving its right eye down one inch, then the resultant aligned image would likely not be a human face, and thus such a deformation would typically not be permissible.

In the example of FIG. 1, the model face 1A is first placed roughly within the proximity of predefined points of interest, and typically placed near the center of subject face 2, as illustrated in image 3. By comparing the amount of misalignment resulting from moving model face 1A in one direction or another, and the results of adjusting a size multiplier in any of several predefined directions, one can determine how to better align model face 1, as illustrated in image 4. An objective would be to align as closely as possible predefined landmarks, such as the pupils, nostril, mouth corners, etc., as illustrated in image 5. Eventually, after a sufficient number of such landmark points have been aligned, the subject image 2 is warped onto model image 1A resulting in a fitted image 6 with easily identifiable and labeled points of interest that can be further processed to achieve specific objectives.

This approach, however, does not take into account changes in appearance, i.e. shadow, color, or texture variations for example. A more holistic, or global, approach that jointly considers the object's shape and appearance is the Active Appearance Model (AAM). Although Cootes et al. appear to focus primarily on the gray-level (or shade) feature of appearance, they do describe a basic principle that AAM searches for the best alignment of a model face (including both model shape parameters and model appearance parameters) onto a subject face while simultaneously minimizing misalignments in shape and appearance. In other words, AAM applies knowledge of the expected shapes of structures, their spatial relationships, and their gray-level appearance (or more generally color value appearance, such as RGB values) to restrict an automated system to plausible interpretations. Ideally, AAM is able to generate realistic images of sought objects. An example would be a model face capable of generating convincing images of any individual, changing their expression and so on. AAM thus formulates interpretation as a matching problem: given an image to interpret, structures are located and labeled by adjusting the model's parameters in such a way that it generates an 'imagined image' that is as similar as possible to the real thing.

Although AAM is a useful approach, implementation of AAM still poses several challenges. As stated above, an AAM machine generates results from the application of statistical analysis of a library of true samples to define distinguishing parameters and the parameter's permissible distortions. By the nature of the statistical analysis, the results will permit alignment only with a fraction of all true samples. If the subject category is prone to a wide range of changes, such as cable harness that can take any distortion when dropped onto an assembly line (such as a conveyor belt), the model may not be able to properly align itself to an input subject image with characteristics beyond the norm defined by the shape or appearance model.

Another limitation of an AAM machine is that construction of the model (or conical) image (i.e. model face 1A in the example of FIG. 1), requires much human intervention to identify the distinguishing features of the specific object being sought.

For example with reference to FIG. 2, model face 1A may be constructed from a library of training images 1 (i.e. true face images). Typically, a user manually places "landmark" points on each training image to outline specific features characteristic to the class of object being represented. The landmark points are ideally selected in such a way that the landmark points outline distinguishable features within the class common to every training image. For instance, a common feature within a face class may be the eyes, and when building a model of the appearance of an eye in a face image, landmark points may be placed at the corners of the eye since these features would be easy to identify in each training image. In addition to the landmark points, however, an active appearance model (AAM) machine also makes use of appearance data (i.e. shade data and/or color data and/or texture data, etc.) at various patches of each training image to create a distribution range of acceptable appearances for corresponding patches within model face 1A. This appearance data constitutes additional features in the overall statistical analysis.

Thus, an AAM machine may be too complicated and computationally intensive for practical machine vision applications in industrial assembly lines where the object class is prone to great deformation, such as when the object class is one or more types of wire harnesses. Thus, machine vision applications typically rely on more automated methods of identifying characteristic features and object edges in a captured image. Additionally if a machine is expected to interact with an object in an assembly line, such as if a robot is intended to pick up a specific type of wire harness from a bin of multiple wire harnesses and attached (i.e. plug) a specific end of the harness to a specific receptacle, the machine will need some sort of depth perception to properly manipulate the robot.

Thus, edge detection algorithms are part of many image manipulation operations. Edge detection is fundamental to image processing and computer vision, particularly in the areas of feature detection and feature extraction. Edge detection aims to identify points, i.e. pixels that outline objects within an image. There are many edge detection algorithms, but generally they attempt to identify pixels at which discontinuities occurs, i.e. where the image brightness changes sharply. In the ideal case, the result of applying an edge detector to an image leads to a set of connected curves that indicate the boundaries of objects, the boundaries of surface markings, and discontinuities in surface orientation. Once the boundaries have been identified, various image processing operations may be applied to the digital image.

For example FIG. 3A shows a typical digital image, and FIG. 3B shows the results of applying edge detection to the image of FIG. 3A. Edge detection may be designed to identify thick or thin lines, or may be optimized to separately identify thick and thin lines. In the example of FIG. 3B, both thick and thin lines are separately identified, which permits them to be separately processed. This permits the processing of the digital image to be more specialized by adjusting the size of a pixel-processing window according to line thickness. As a result, application of a specific image processing algorithms, such a bilateral filter, may be optimized along the edge of objects according to line thickness to achieve a sharper final image, as shown in FIG. 3C.

Another use of edge detection is feature detection. As an example, if one has a library of identifying features of a specific object, then one may search an input digital image for those identifying features in an effort to determine if an example of the specific object is present in the input digital image. When this is extended to multiple digital images of a common scene taken from different view angles, it is possible to index, i.e. match or correlate, feature points from one image to the other. This permits the combined processing of the multiple digital images.

For example in FIG. 4, images 7A, 7B, 7C and 7D each provide partial, and overlapping, views of a building in a real-world scene, but none provide a full view of the entire building. However, by applying edge detection and indexing (i.e. identifying matching pairs of) feature points in the four partial images 7A, 7B, 7C and 7D that correlate to the same real feature point in the real-world scene, it is possible to stitch together the four partial images (i.e. applying an image stitching tool) to create one composite image 7E of the entire building. The four partial images 7A, 7B, 7C and 7D of FIG. 4 are taken from the same view angle, but this approach may be extended to the field of correspondence matching, where images of a common scene are taken from different view angles.

Images of a common scene are taken from different view angles are the basis for stereo vision and depth perception. In this case, corresponding feature points in two images taken from different view angles (and/or different fields of vision) of the same subject (or scene) can be combined to create a perspective view of the scene. Thus, imaging a scene from two different view points (i.e. from two different fields of vision, FOV) creates stereo vision, which provides depth information about objects in the scene.

This ability would be particularly helpful in the field of robotics and automated assembly/constructions. In these applications, a machine having stereo vision and the ability to discern (i.e. identify) target items would have the ability to independently retrieve the target item and use it in an assembly.

Implementing such vision capabilities, however, is still a challenge, even in a specialized assembly line where the number of possible target object variants is limited. The challenges become even more daunting when the target objects are amorphous, or otherwise prone to change in shape and/or appearance, such as in the case of wire harnesses.

It is an object of the present invention to provide a stereo vision capability suitable for discerning a target object in a perspective (3D) scene.

It is a further object of the present invention to provide such a stereo vision capability suitable for use with wire harness, and other amorphous objects.

SUMMARY OF INVENTION

The above objects are met in a method of identifying corresponding objects in first and second images of a stereoscopic pair of images, said method comprising the following steps: (a) determining a first set of connected components from said first image, and a second set of connected components from said second image; (b) determining a first set of feature descriptors from said first set of connected components and a second set of feature descriptors from said second set of connected components; (c) matching pairs of corresponding feature descriptors between the first and second sets of feature descriptors; (d) applying global homography to said first and second images to reject matched pairs of corresponding feature descriptors that do not satisfy global homography constraints; (e) for each pair of corresponding feature descriptors not rejected in step (d), applying local homography to the pair of corresponding feature descriptors in accordance to the pair's corresponding connected components, and rejecting any pair of corresponding feature descriptors that does not satisfy its local homography constraints, the remaining pairs of corresponding feature descriptors defining current connected components in their respective first and second images; and (f) within the footprints of each pair of corresponding current connected components, for each unknown pixel defined as a pixel not known as being a part of the connected component within whose footprint the unknown pixel resides, determining if a corresponding match for the unknown pixel can be identified in the corresponding paired current connected component, the matched pixels of each pair of current corresponding components identifying a corresponding object in said first and second images of said stereoscopic pair of images.

In this method, step (a) preferably includes segmenting said first image into a first set of segments, each segment in said first set of segments encompassing a unique portion of said first image having a similar predominant image characteristic; segmenting said second image into a second set of segments, each segment in said second set of segments encompassing a unique portion of said second image having a similar predominant image characteristic; said first set of connected components is determined by separately determining the connected components in each segment of said first set of segments; and said second set of connected components is determined by separately determining the connected components in each segment of said second set of segments.

Preferably, in step (b), said first and second sets of feature descriptors are determined by means of a Features from Accelerated Segment Test (i.e., FAST) transform or a scale-invariant feature transform (i.e. SIFT) or an Affine SIFT (or ASIFT) transform. In step (b), the feature descriptors are feature point descriptors.

Preferably in step (b), IF a connected component has an elongated shape with two opposing ends, and its orientation is substantially parallel to a reference base line; THEN feature descriptors are determined only for the opposing endpoints of the elongated shape of said connected component; ELSE feature descriptors are determined for the entirety of said connected component. In this case, the elongated shape is preferably defined by an elongated length portion between said opposing ends, and a ratio of the width to the length of the elongated portion is not greater than 0.25.

Additionally, step (c) may implement a hierarchical tree model based approach to matching corresponding feature descriptors.

Further preferable in step (d), global homography is applied by means of a homography prior routine with a threshold not smaller than predefined value. This predefined value is preferably 20.

Preferably in step (f), the measure of matching for an unknown pixel is interpolated from matching information of known pixels, said known pixels being pixels known to be a part of the same current connected component within which the unknown pixel resides. Additionally: (I) in step (b): IF a connected component has an elongated shape between a pair of two opposing ends, and its orientation substantially parallel to a reference base line; THEN feature descriptors are determined only for the opposing endpoints of said connected component; ELSE feature descriptors are determined for the entirety of said connected component; and (II) in step (f), correspondence interpolation is applied by: assuming a planar geometry for imaged objects in between known pairs of corresponding feature descriptors; linearly interpolate correspondence values for unknown pixels using known pixels; and for each pair of current connected components corresponding to a pair of said two opposing ends, interpolating for all unknown pixels in between the opposing ends, assuming a substantially straight shape. Additionally in step (f), correspondence interpolation is preferably applied by: for each unknown pixel, $p_0$: (i) finding k nearest neighbors pixels $p_{i(0 \leq i < k)}$ that have known correspondences $p'_{i(0 \leq i < k)}$; (ii) for each of said nearest neighbor pixels, computing a weight as $w_i = (1.0/|p_0 - p_i|)$, where $p_0$ and $p_i$ are 2D image coordinates; and (iii) interpolating correspondence for $p_0$ to define an interpolated known pixel $p'_0$ using normalized weights, as follows wherein k preferably is 6:

$$p'_0 = \frac{\sum_{i=1}^{k} w_i p'_i}{\sum_{i=1}^{k} w_i}$$

On a preferred embodiment, in step (f), said measure of matching is determined by: determining a new set of feature descriptors for each pair of corresponding current connected components, matching pairs of corresponding new feature descriptors within said new sets.

The preferred embodiment further included following step (f): a step (g) of using dense correspondence for stereo triangulation of the matched pixels to define a separate 3D cloud for each pair of current corresponding components, each separate 3D cloud also identifying corresponding objects in said first and second images of said stereoscopic pair of images.

Preferably, the corresponding objects are corresponding cable harnesses.

The above objects are also met in a non-transient memory storage medium encompassing computer-readable instructions for executing the above-described method.

The above objects are further met in a computer-operated system identifying corresponding objects in first and second images of a stereoscopic pair of images, said system comprising: an imaging device for generating said first and second images of a common scene; and a computing device implementing the following steps: (a) determining a first set of connected components from said first image, and a second set of connected components from said second image; (b) determining a first set of feature descriptors from said first set of connected components and a second set of feature descriptors from said second set of connected components; (c) matching pairs of corresponding feature descriptors between the first and second sets of feature descriptors; (d) applying global homography to said first and second images to reject matched pairs of corresponding feature descriptors that do not satisfy global homography constraints; (e) for each pair of corresponding feature descriptors not rejected in step (d), applying local homography to the pair of corresponding feature descriptors in accordance to the pair's corresponding connected components, and rejecting any pair of corresponding feature descriptors that does not satisfy its local homography constraints, the remaining pairs of corresponding feature descriptors defining current connected components in their respective first and second images; and (f) within the footprints of each pair of corresponding current connected components, for each unknown pixel defined as a pixel not known as being a part of the connected component within whose footprint the unknown pixel resides, determining if a corresponding match for the unknown pixel can be identified in the corresponding paired current connected component, the matched pixels of each pair of current corresponding components identifying a corresponding object in said first and second images of said stereoscopic pair of images.

Preferably, the computer-operated system is part of an assembly line, and said common scene is a predefined portion of said assembly line.

Also preferably, the corresponding objects are cable harnesses.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 18 illustrates the extraction of connected components, CC, from a given image after image segmentation.

DESCRIPTION OF THE PREFERRED EMBODIMENTS

Object recognition, or object identification, is an integral part of computer vision, and an integral part of object identification is pattern matching, which in turn make use of feature detection techniques. Theses are techniques for identifying parts of an image, or individual feature points of an image (such as individual pixels), that are good candidates for investigation to determine if they might be part of a sought object.

Various techniques are known for identifying feature points, or individual pixels, in an image that may be used to describe an imaged scene. As an example, if one has a library of identifying feature points obtained from a library of training images, then one may search an input digital (test) image for those identifying features in an effort to determine if an example of the specific object is present in the input digital image. In the field of computer vision, this idea has been extended to matching common features of a common scene in multiple digital images of the common scene taken from different view angles to index, i.e. match or correlate, feature points from one image to the other. This permits the combined processing of the multiple digital images.

Figure 1:
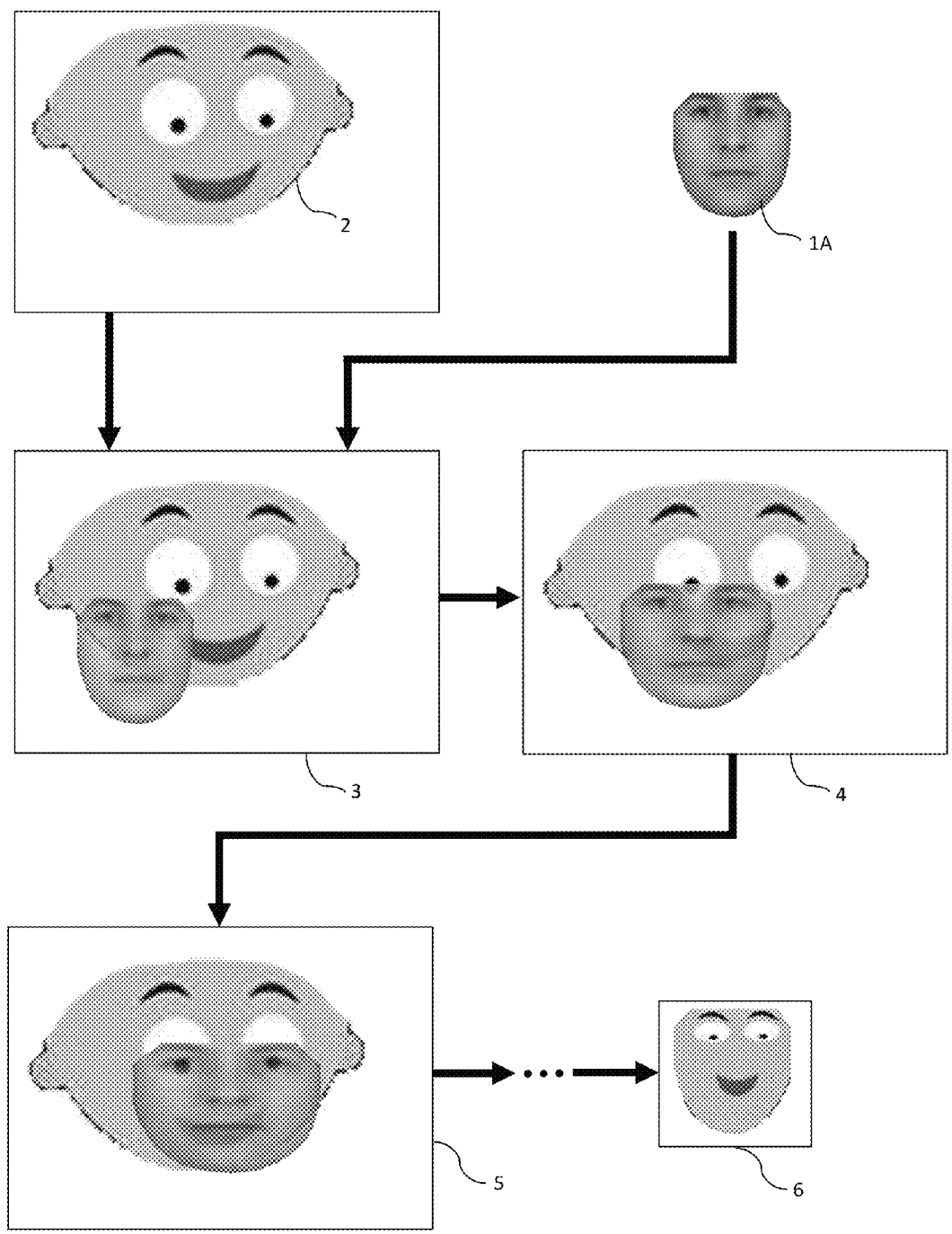
FIG. 1 illustrates the fitting of an object within an image to a model shape of that object class.
Figure 2:
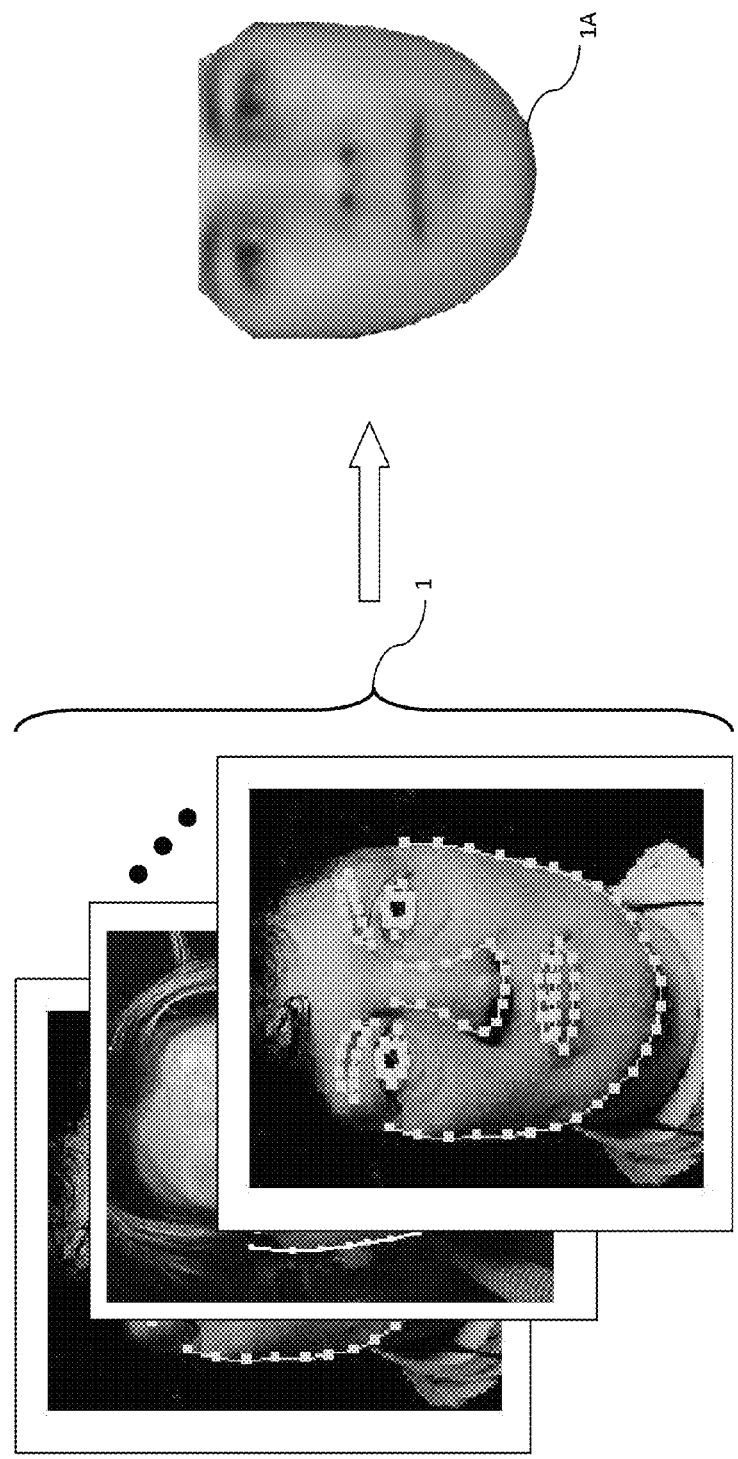
FIG. 2 illustrates the defining of a model shape of a specific object class, i.e., a human face, by combining characteristic of a collection of training images and provided "landmark" points.
Figure 3A:
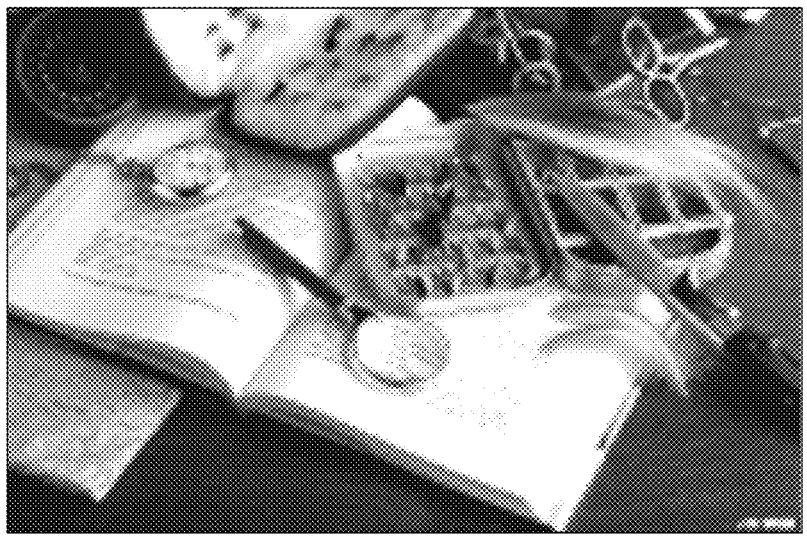
FIGS. 3A, 3B, and 3C illustrate the use of edge detection for the purposes of selecting filter types for specific parts of an image to improve image clarity.
Figure 3B:
Figure 3C:
Figure 4:
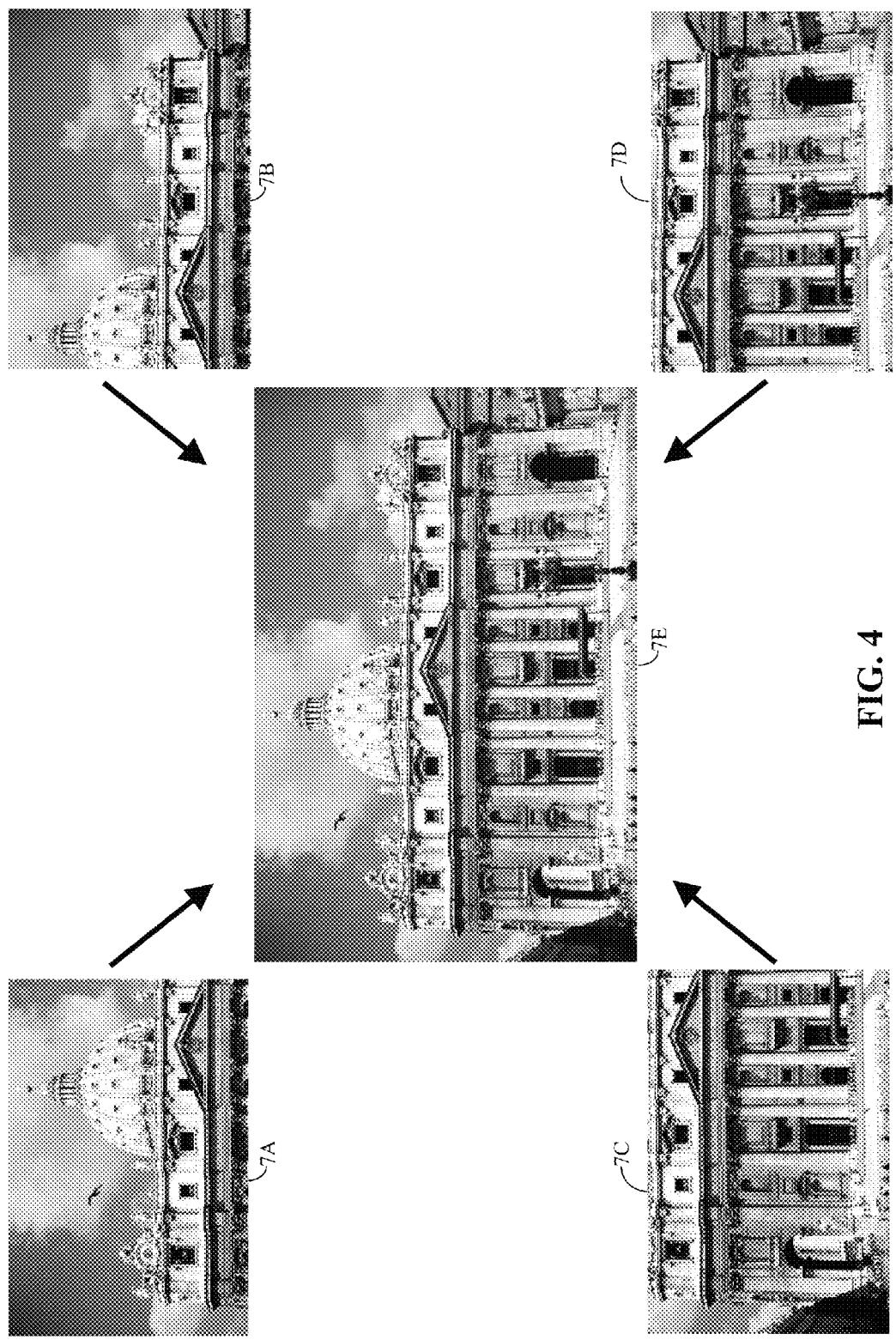
FIG. 4 illustrates the use of corresponding feature points in different images to stitch together the image to create a larger composite image.

For example in FIG. 4, images 7A, 7B, 7C and 7D each provide partial, and overlapping, views of a building in a real-world scene, but none provide a full view of the entire building. However, by applying edge detection and indexing (i.e. identifying matching pairs of) feature points in the four partial images 7A, 7B, 7C and 7D that correlate to the same real feature point in the real-world scene, it is possible to stitch together the four partial images (i.e. applying an image stitching tool) to create one composite image 7E of the entire building. The four partial images 7A, 7B, 7C and 7D of FIG. 4 are taken from the same view angle, but this approach may be extended to the field of correspondence matching.

Correspondence matching refers to the matching of objects or object features (or more typically, the matching of feature points, i.e. individual pixels) common to two or more images. Correspondence matching tries to figure out which parts of a first image correspond to (i.e. are matched to) which parts of a second image, assuming that the second image was taken after the camera that took the first image had moved, time had elapsed, and/or the pictured objects had moved. For example, the first image may be of a real-world scene taken from a first view angle with a first field-of-vision, FOV, and the second image may be of the same scene taken from a second view angle with a second FOV. Assuming that the first and second FOVs at least partially overlap, correspondence matching refers to the matching of common features points in the overlapped portions of the first and second images.

Thus, correspondence matching is an essential problem in computer vision, especially in stereo vision, view synthesis, and 3D (or perspective) reconstruction. Assuming that a number of image features, or objects, in two images taken from two view angles have been matched, epipolar geometry may then be used to identify the positional relationship between the matched image features to achieve stereo view synthesis, or 3D reconstruction.

Epipolar geometry is basically the geometry of stereo vision. For example in FIG. 5, two cameras 11 and 13 create two 2D images 15 and 17, respectively, of a common 3D scene 10 consisting of a larger sphere 19 and a smaller sphere 21. 2D images 15 and 17 are taken from two distinct view angles 23 and 25. Epipolar geometry describes the geometric relations between points in 3D scene 10 (for example spheres 19 and 21) and their relative projections in 2D images 15 and 17. These geometric relationships lead to constraints between the image points, which are the basis for epipolar constraints, or stereo constraints, described more fully below.

Figure 5:
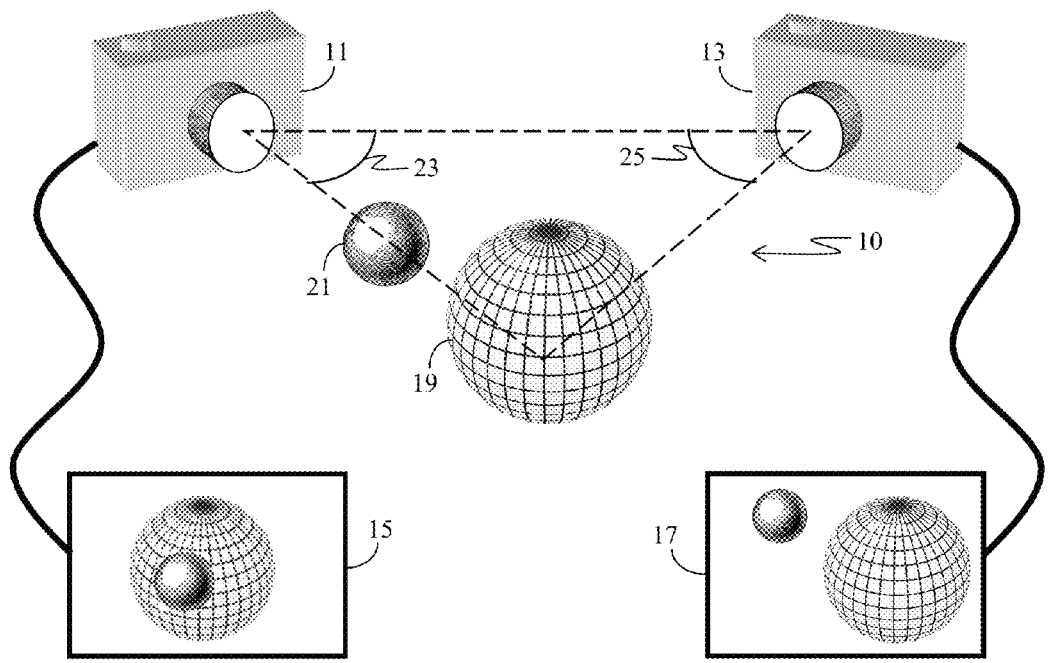
FIG. 5 illustrates the principles of Epipolar geometry.

FIG. 5 illustrates a horizontal parallax where, from the view point of camera 11, smaller sphere 21 appears to be in front of larger sphere 19 (as shown in 2D image 15), but from the view point of camera 13, smaller sphere 21 appears to be some distance to the side of larger sphere 19 (as shown in 2D image 17). Nonetheless, since both 2D images 15 and 17 are of the same 3D scene 10, both are truthful representations of the relative positions of larger sphere 19 and smaller sphere 21. The positional relationships between camera 11, camera 13, smaller sphere 21 and larger sphere 19 thus establish geometric constraints on 2D images 15 and 17 that permit one to reconstruct 3D scene 10 given only 2D images 15 and 17, as long as the epipolar constraints (i.e. stereo constraints) are known.

Figure 6:
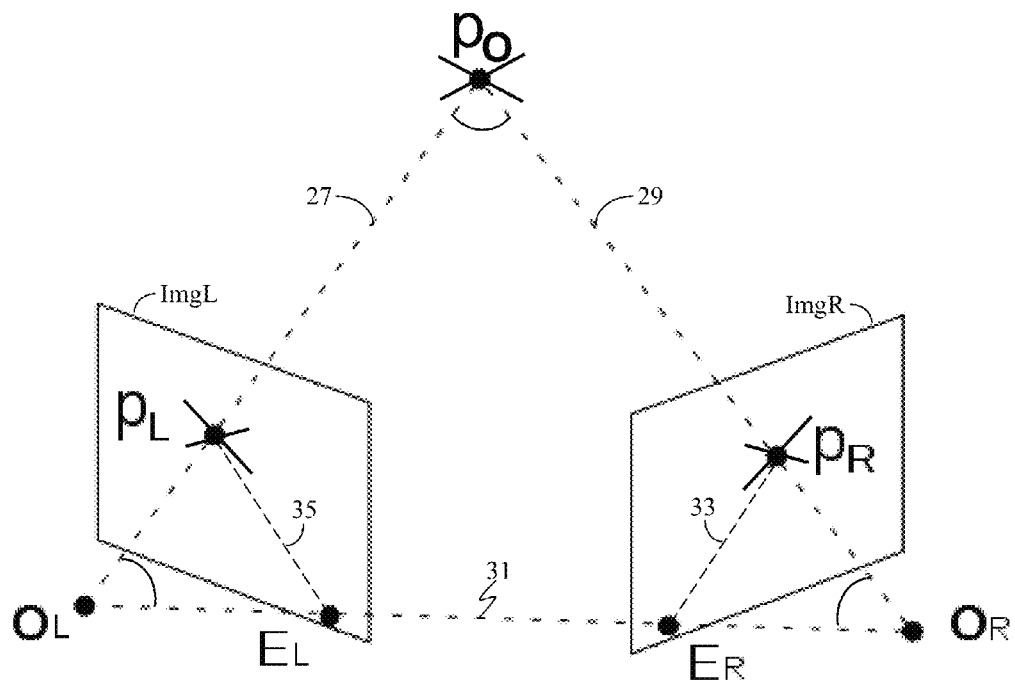
FIG. 6 is an example of defining stereo constraints using Epipolar geometry.

Epipolar geometry is based on the pinhole camera model, a simplified representation of which is shown in FIG. 6. In the pinhole camera model, cameras are represented by a point, such as left point $O_L$ and right point $O_R$, at each respective camera's focal point. Point $P_O$ represents the point of interest (i.e. an object) in the 3D scene being imaged, which in the present example is represented by two crisscrossed lines.

Typically, the image plane (i.e. the plane on which a 2D representation of the imaged 3D scene is captured) is behind a camera's focal point and is inverted. For ease of explanation, and to avoid the complications of a an inverted captured image, two virtual image planes, ImgL and ImgR, are shown in front of their respective focal points, $O_L$ and $O_R$, to illustrate non-inverted representations of captured images. One may think of these virtual image planes as windows through which the 3D scene is being viewed. Point $P_L$ is the 2D projection of point $P_O$ onto left virtual image ImgL, and point $P_R$ is the 2D projection of point $P_O$ onto right virtual image ImgR. This conversion from 3D to 2D may be termed a perspective projection, or image projection, and is described by the pinhole camera model, as it is known in the art. It is common to model this projection operation by rays that emanate from a camera and pass through its focal point. Each modeled emanating ray would correspond to a single point in the captured image. In the present example, these emanating rays are indicated by dotted lines 27 and 29.

Epipolar geometry also defines the constraints relating the positions of each camera relative to each other. This may be done by means of the relative positions of focal points $O_L$ and $O_R$. The focal point of a first camera would project onto a distinct point on the image plane of a second camera, and vise-versa. In the present example, focal point $O_R$ projects onto image point $E_L$ on virtual image plane ImgL, and focal point $O_L$ projects onto image point $E_R$ on virtual image plane ImgR. Image points $E_L$ and $E_R$ are termed epipoles, or epipole points. The epipoles and the focal points they project from lie on a single line, i.e. line 31.

Line 27, from focal $O_L$ to point $P_O$, is seen as a single point $P_L$ in virtual image plane ImgL, because point $P_O$ is directly in front of focal point $O_L$. This is similar to how in image 15 of FIG. 5; smaller sphere 21 appears to be in front of larger sphere 19. However, from focal point $O_R$, the same line 27 from $O_L$ to point $P_O$ is seen a displacement line 33 from image point $E_R$ to point $P_R$. This is similar to how in image 17 of FIG. 5; smaller sphere 21 appears to be displaced to the side of larger sphere 19. This displacement line 33 may be termed an epipolar line. Conversely from focal point $O_R$, line 29 is seen as a single point $P_R$ in virtual image plane ImgR, but from focal point $O_L$ line 29 is seen as displacement line, or epipolar line, 35 on virtual image plane ImgL.

Epipolar geometry thus forms the basis for triangulation. For example, assuming that the relative translation and rotation of cameras $O_R$ and $O_L$ are known, if projection point $P_L$ on left virtual image plane ImgL is known, then the epipolar line 33 on the right virtual image plane ImgR is known by epipolar geometry. Furthermore, point $P_O$ must projects onto the right virtual image plane ImgR at a point $P_R$ that lies on this specific epipolar line, 33. Essentially, for each point observed in one image plane, the same point must be observed in another image plane on a known epipolar line. This provides an epipolar constraint that corresponding image points on different image planes must satisfy.

Another epipolar constraint may be defined as follows. If projection points $P_L$ and $P_R$ are known, their corresponding projection lines 27 and 29 are also known. Furthermore, if projection points $P_L$ and $P_R$ correspond to the same 3D point $P_O$, then their projection lines 27 and 29 must intersect precisely at 3D point $P_O$. This means that the three dimensional position of 3D point $P_O$ can be calculated from the 2D coordinates of the two projection points $P_L$ and $P_R$. This process is called triangulation.

Figure 7:
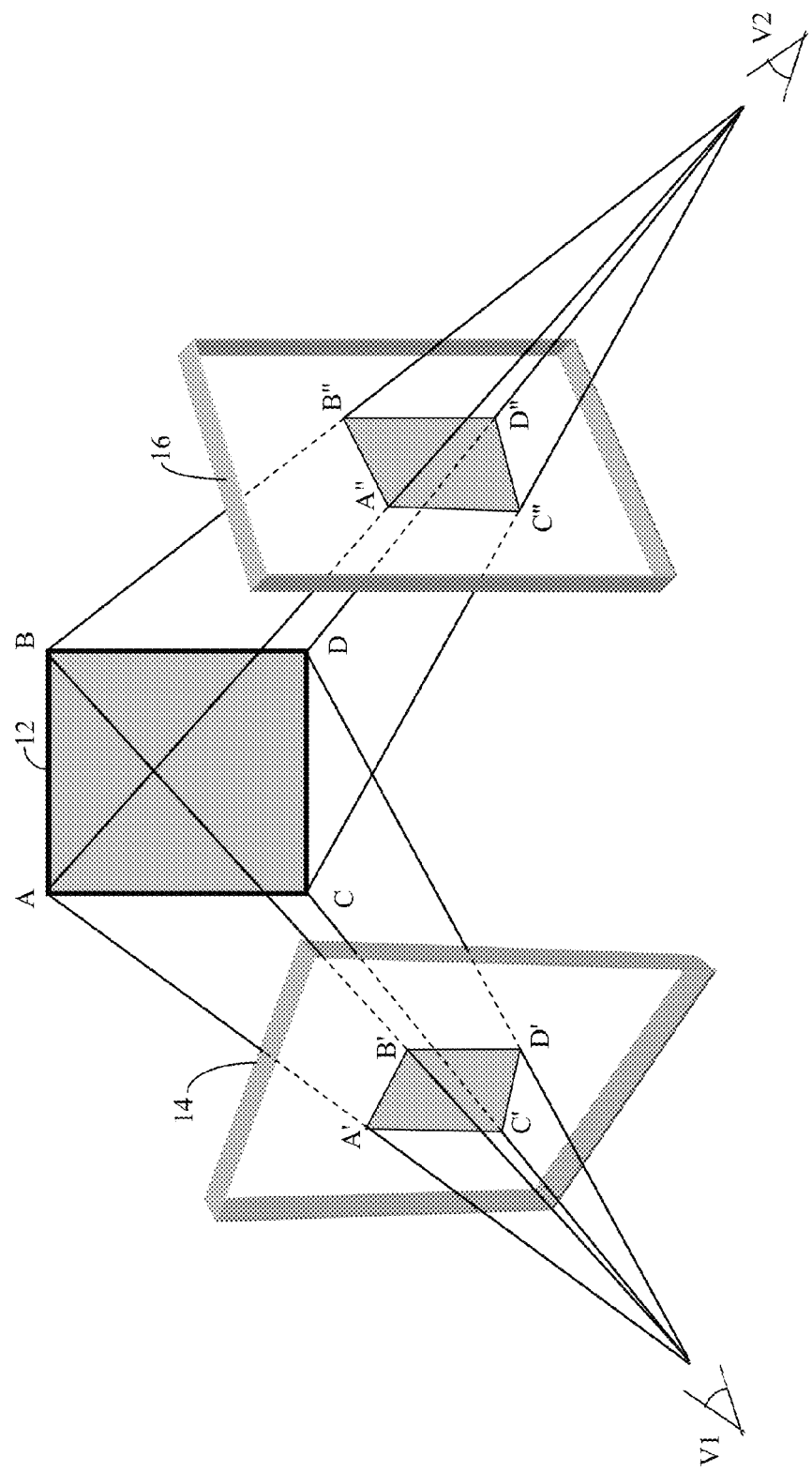
FIG. 7 illustrates the establishment of homography constraints from stereo constraints.

Epipolar geometry also forms the basis for homography, i.e. projective transformation. Homography describes what happens to the perceived positions of observed objects when the point of view of the observer changes. An example of this is illustrated in FIG. 7, where the shape of a square 12 is shown distorted in two image projections 14 and 16 as viewed from two different points of view V1 and V2, respectively. Like before, image planes 14 and 16 may be thought of as windows through which the square 12 is viewed.

Homography would identify the points in common between image projections 14 and 16 and square 12 (i.e. point registration). For example, the four corners A, B, C and D of square 12 correspond to points A', B', C' and D' in image projection 14, and correspond to points A", B", C" and D" in image projection 16. Thus, points A', B', C' and D' in image projection 14 correspond respectively to points A", B", C" and D" in image projection 16.

Assuming that the pinhole model applies, epipolar geometry permits homography to relate any two images of the same planar surface in space, which permits image rectification, image registration, or computation of camera motion (rotation and translation) between two images. Once camera rotation and translation have been extracted from an estimated homography matrix, this information may be used for navigation, or to insert models of 3D objects into an image or video, so that they are rendered with the correct perspective and appear to have been part of the original scene.

Figure 8:
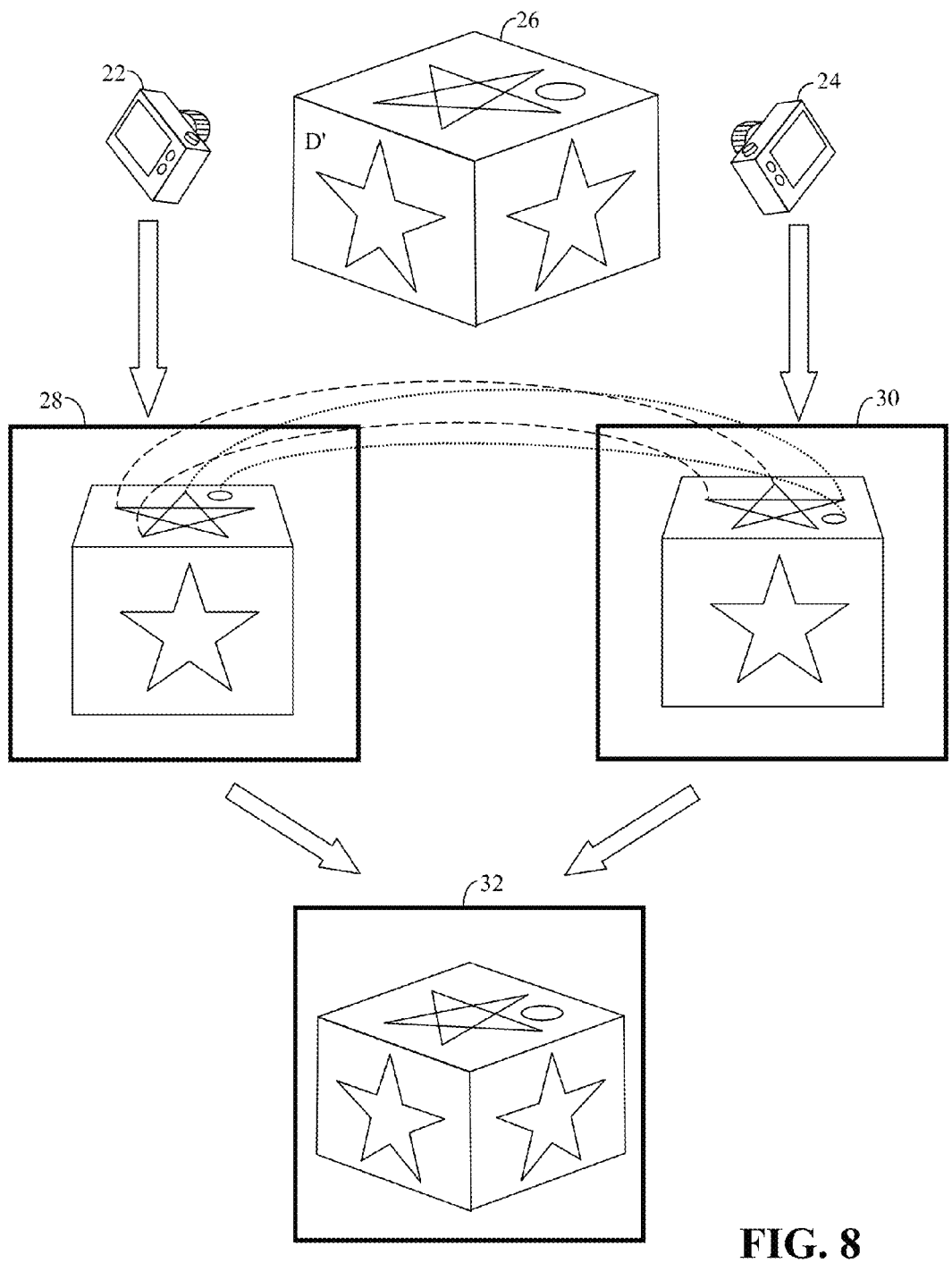
FIG. 8 illustrates homography to re-establish a perspective (i.e. 3D) view from a stereo pair of image taken of a common scene.

For example in FIG. 8, cameras 22 and 24 each take a picture of a 3D scene of a cube 26 from different points of view. From the view point of camera 22, cube 26 looks as shown in 2D image 28, and from the view point of camera 24, cube 26 looks as shown in 2D image 30. Homography permits one to identify correlating points, some of which are shown by dotted lines for illustration purposes. This permits both 2D images 28 and 30 to be stitched together to create a 3D image, as shown in image 32. Thus, automatically finding correspondence between pairs of images is the classic problem of stereo vision. Integral to this, however, is the identifying of feature points in the pairs of images, and the matching of corresponding feature points in the pairs of images.

As a result, feature based correspondence matching algorithms have found wide application in computer vision. Examples of feature based correspondence matching algorithms are the scale-invariant feature transform, SIFT, and the Affine SIFT (or ASIFT). It is noted, however, that feature based correspondence matching algorithms such as SIFT and Affine SIFT purposely exclude edge points from their analysis, and thus are not well suited for edge detection.

As it is known in the art, the SIFT algorithm scans an image and identifies points of interest, or feature points, which may be individual pixels and describes them sufficiently (typically relative to its neighboring pixels within a surrounding window) so that the same feature point (or pixel) may be individually identified in another image. A discussion of the SIFT transform is provided in U.S. Pat. No. 6,711,293 to Lowe, which is herein incorporated in its entirety by reference. Essentially, SIFT uses a library of training images to identify feature points that are characteristic of a specific object. Once a library of the object's characteristic feature points have been identified, the feature points can be used to determine if an instance of the object is found in a newly received test image.

Principally, feature points (i.e. points of interest) of the object are extracted to provide a "feature description" of a specific object. This description, extracted from training images, can then be used to identify the specific object in a test image containing many object-types. To perform reliable recognition, it is preferred that the features extracted from the training images be detectable under changes in image scale, noise, illumination, and rotation. Feature points usually lie near high-contrast regions of an image. However, since distortion of an object (such as if a feature points is located in an articulated or flexible parts of the object) may alter a feature point's description relative to its neighboring pixels, changes to an object's internal geometry may introduce errors. To compensate for these errors, SIFT typically detects and uses a large number of feature points so that the effects of errors contributed by these local variations may be reduced.

In a typical SIFT application, feature points of objects are first extracted from a set of training images and stored in a database. An object is recognized in a new image (i.e. a test image) by individually comparing each feature point extracted from the new image with the feature points in this database and finding candidate matching features based on Euclidean distance of their feature point vectors. From the full set of matches, subsets of feature points that agree on the object and its location, scale, and orientation in the new image are identified to filter out good matches. Consistent clusters of good matches are then identified. Typically, each cluster of three or more features that agree on an object and its pose is then subject to further detailed model verification and subsequently outliers are discarded. Finally the probability that a particular set of features indicates the presence of a specific object is computed, given the accuracy of fit and number of probable false matches. Object matches that pass all these tests can be identified as correct.

Figure 9:
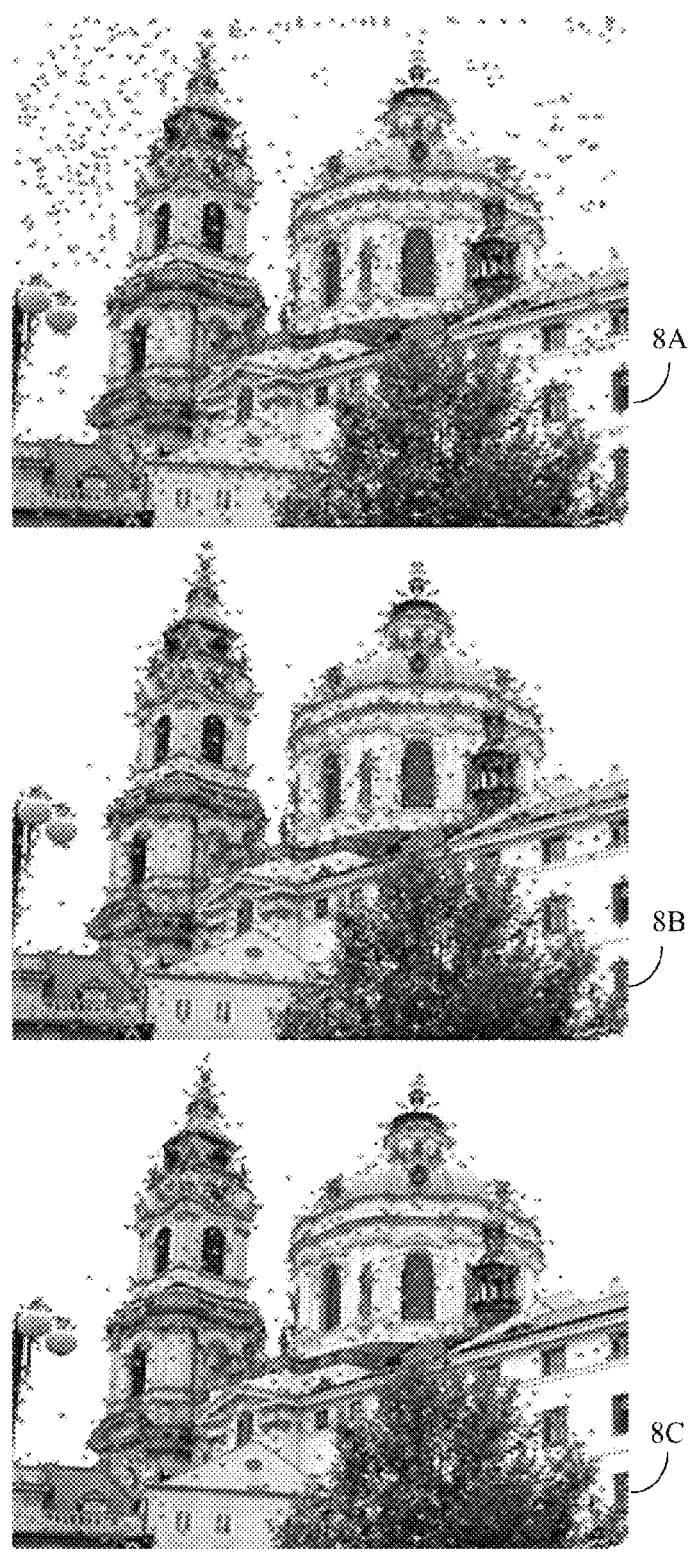
FIG. 9 illustrates feature point extraction from a sample image.

An example of a SIFT determination of feature points in an image is illustrated in FIG. 9. Possible feature points are first identified, as indicated by dark dots in image 8A. Possible feature points that have a low contrast are then discarded, as illustrate in image 8B. Finally, possible features points located on edges are removed, which leaves the final set of feature points shown in image 8C.

Figure 10:
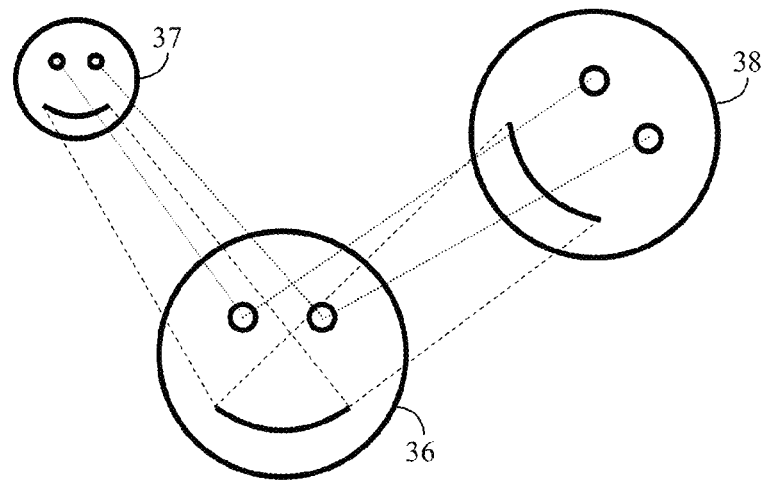
FIG. 10 illustrates the establishment of feature point correspondence using an SIFT transform.

Thus, SIFT permits one to match feature points of an identified object from one image to another. This is illustrated in FIG. 10, where three images of the same object, i.e. a happy face, are shown. For illustration purposes, only four feature points, corresponding to points near the eyes and the corners of the mouth, are shown. As indicated in FIG. 10, SIFT can match feature points from a first face 36 to a second face 37 irrespective of a change in scale. SIFT can also match feature points from first face 36 to a third face 38 irrespective of rotation. However, SIFT has been found to have limited immunity to affine transforms of images. That is, SIFT is limited to the amount of change in the view-angle an imaged object can undergo and still be identified.

A method of extending a SIFT transform to better handle affine transformations is described in "ASIFT: A New Framework for Fully Affine Invariant Image Comparison" by Morel et al, SIAM Journal on Imaging Sciences, vol. 2, issue 2, 2009, which is herein incorporated in its entirety by reference.

Figure 11:
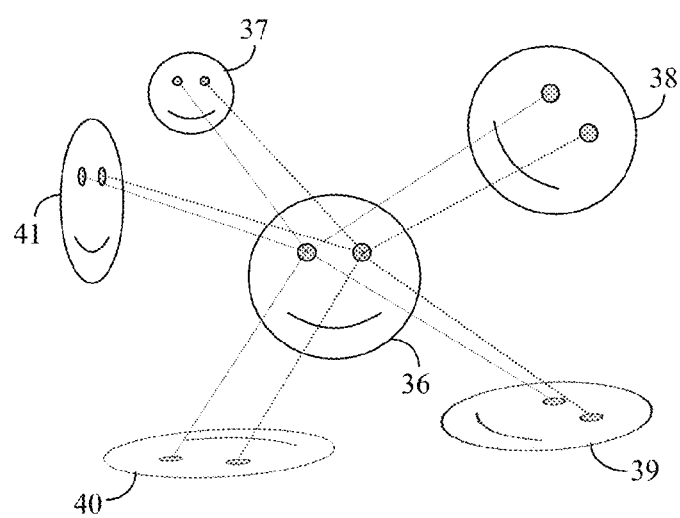
FIG. 11 illustrates the establishment of feature point correspondence using an ASIFT transform.

With reference to FIG. 11, an Affine SIFT would be better able to match feature points from first face 36, to representations of the same object that have undergone affine transformations, as illustrated by happy faces 39, 40, and 41.

Figure 12:
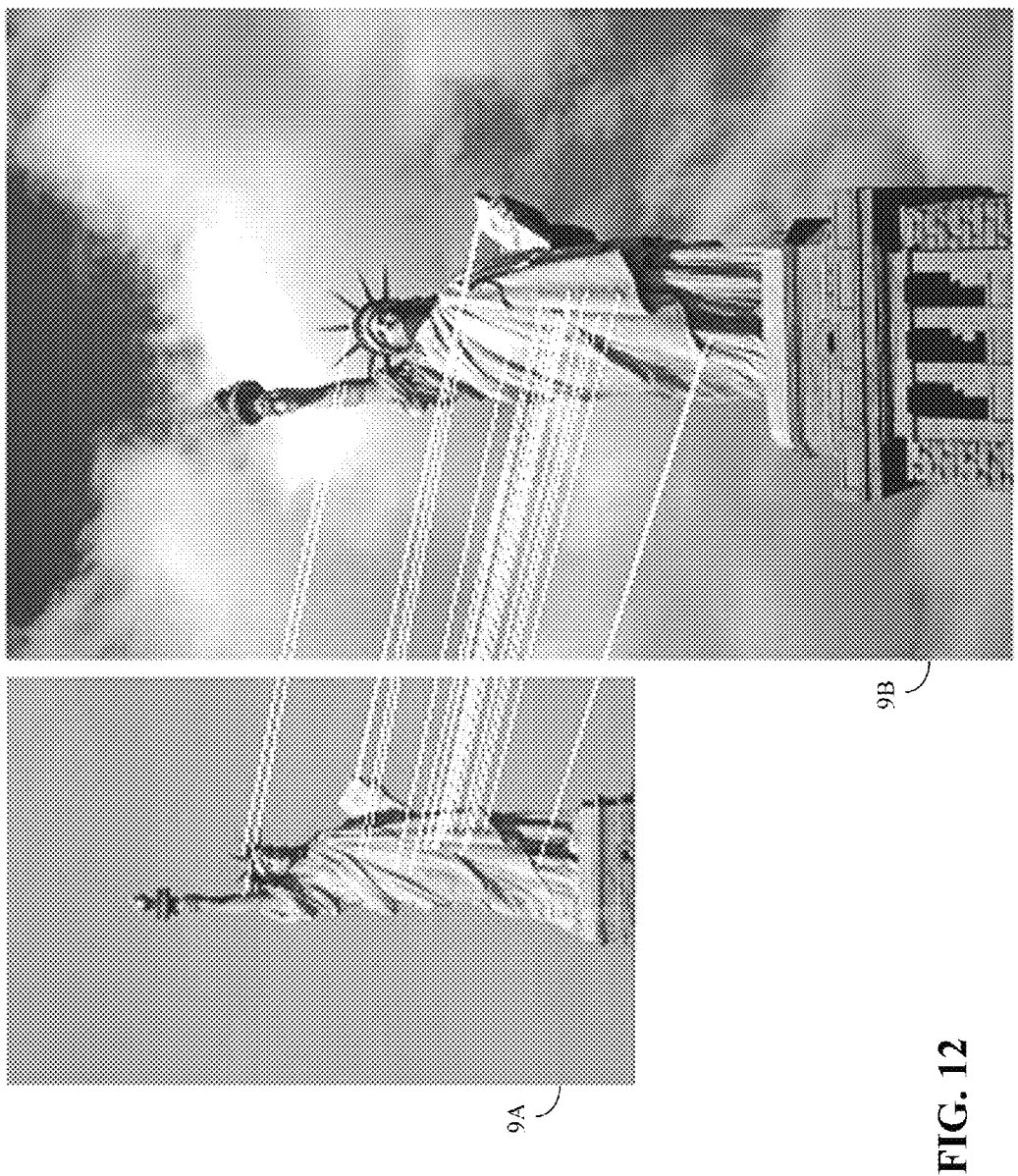
FIG. 12 is an example of feature point correspondence in two images of a common scene, taken from different a field-of-visions, i.e. FOV.

An example of an application of an Affine SIFT transform is illustrated in FIG. 12, where multiple feature points are matched from a first image 9A of the stature of liberty from a first view angle, to a second image 9B of the statue of liberty from a different view angle and at a different scale.

Figure 13:
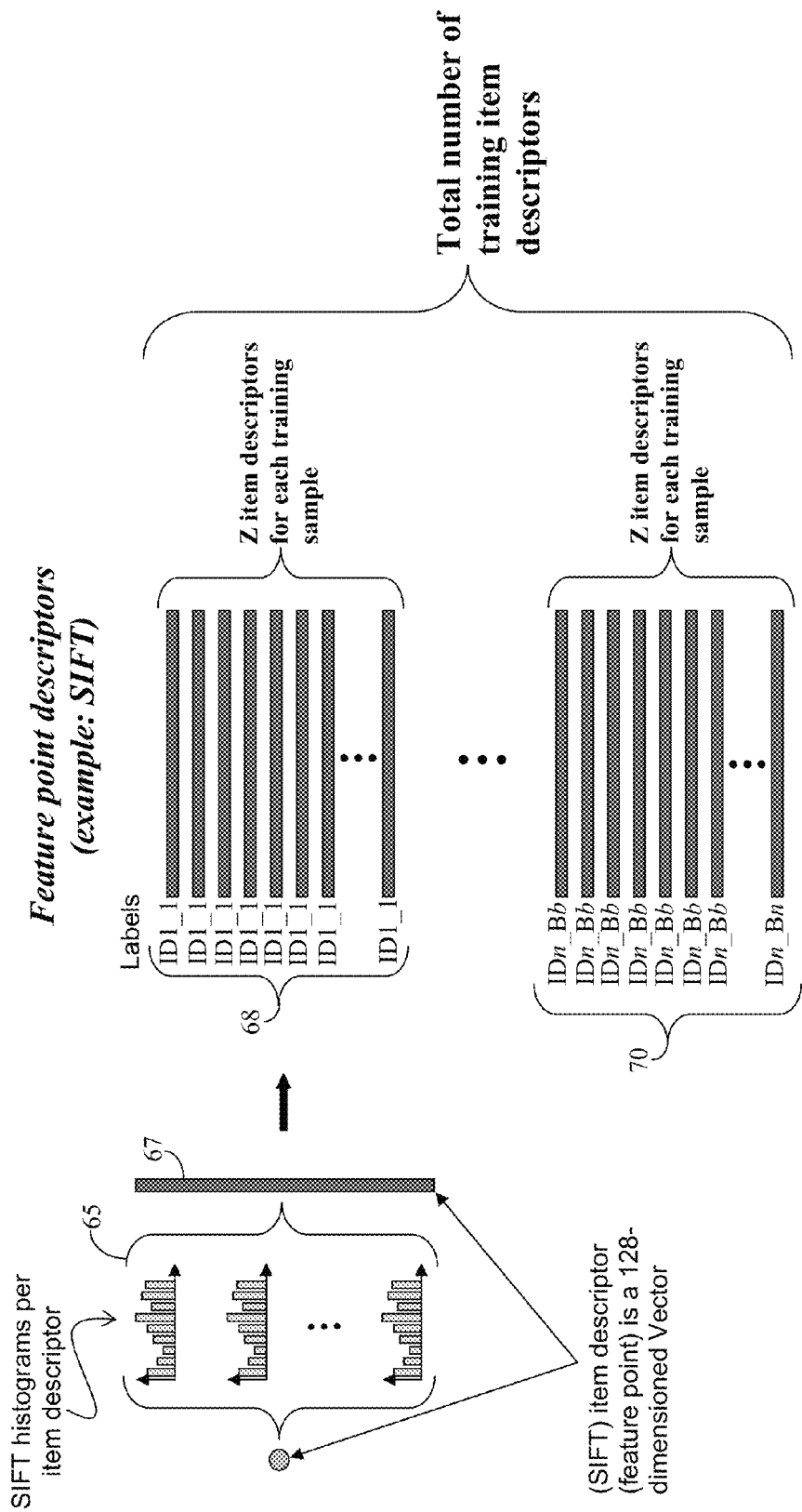
FIG. 13 illustrates that each feature point is defined by a 128-dimension vector comprised of multiple histograms of image pixel characteristics to attempt to uniquely define a pixel, i.e. a feature point.

A quick overview of the feature point extraction function of a SIFT filter/algorithm/module/processor is illustrated in FIG. 13. Each extracted feature point (such as those illustrated in FIG. 9-12) is described by a series of metrics falling to several categories, i.e. distinguishing characteristics. The metrics in each category constitute a histogram. Consequently, a typical SIFT processing algorithm creates a series, or set, of SIFT histograms 65, and each set of histograms collectively describes an individual item descriptor (or feature point or SIFT descriptor). Each of SIFT histograms 65 statistically describes a distinguishing characteristic of the item descriptor relative to neighborhood of pixels (or pixel window) surrounding the item descriptor in the image being processed. The series of SIFT histograms 65 are then collected into single vector 67, which defines one item descriptor. That is, each vector 67 provides sufficient data to identifying an individual pixel within an image. Therefore, each vector 67 describes a single item descriptor (i.e., a feature point or characteristic feature or (feature) pixel) and consists of 128 pieces of descriptive data. Thus, each item descriptor is characterized (i.e., described or identified) by a 128-dimensioned vector 67.

The extracted feature points may then be matched to feature point extracted from other images, and/or they may be used as a training basis to search for other instances of an object in other images. In this case, the extracted feature points are used as training feature point, and typically arranged in a searchable format, such as a hierarchical tree.

For example, the item descriptors may be labeled to identify training sample images from which they were extracted. For example, a first group 68 of item descriptors may be extracted from an image ID1_1. Similarly, a second group (or set) 70 of item descriptors may have been extracted from another image IDb_Bb. The SIFT descriptors corresponding to any given sample image constitutes a set of item descriptors for that image that may be used as a training set to train the SIFT for search another image for an occurrence of the object pictured in the given sample image. For example first image ID1_1 is shown to have a set of Z item descriptors.

In one embodiment, all the sets of items descriptors from sample images of an object to be sought are collected into a composite collection of item descriptors, which is then used to construct a hierarchical tree. One method of achieving this is through a recursive k-means application, as is illustrated in FIGS. 14-16.

Figure 14:
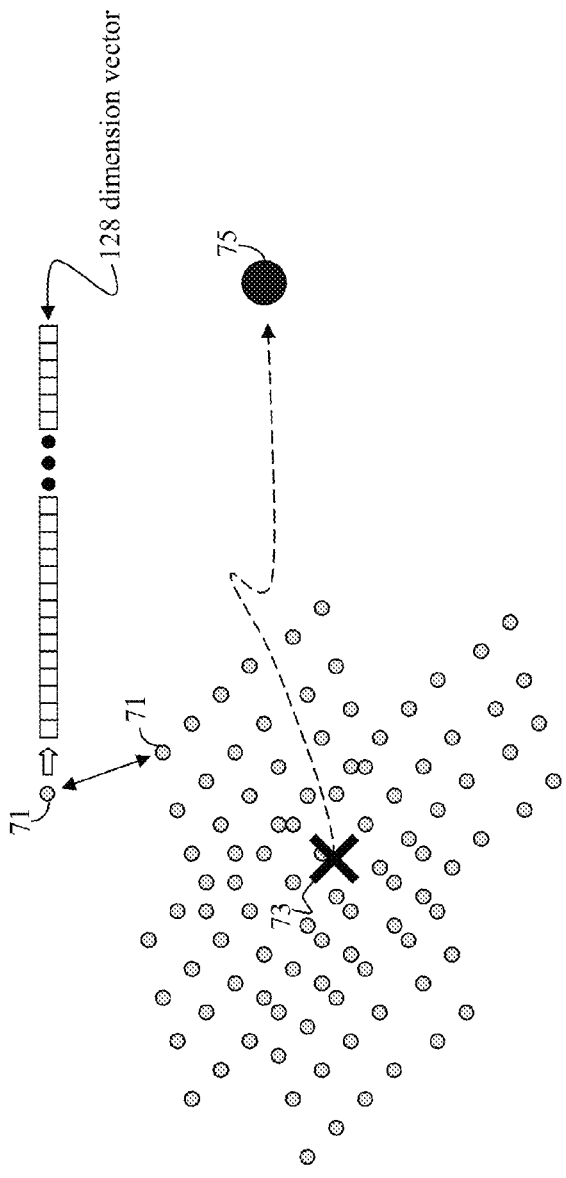
FIGS. 14, 15, and 16 illustrate one method of arranging the information of extracted feature points into a hierarchical tree to ease comparison of feature points between images.

With reference to FIG. 14, although each item descriptor, such as point 71, is a 128-dimension vector, for ease of illustration a clustering of lower-dimensioned item descriptors under a single center (preferably the mean value) is shown. This mean value point 73 may define a root node 75 of a hierarchical tree that may be constructed from the clustering of feature descriptors.

Figure 15:
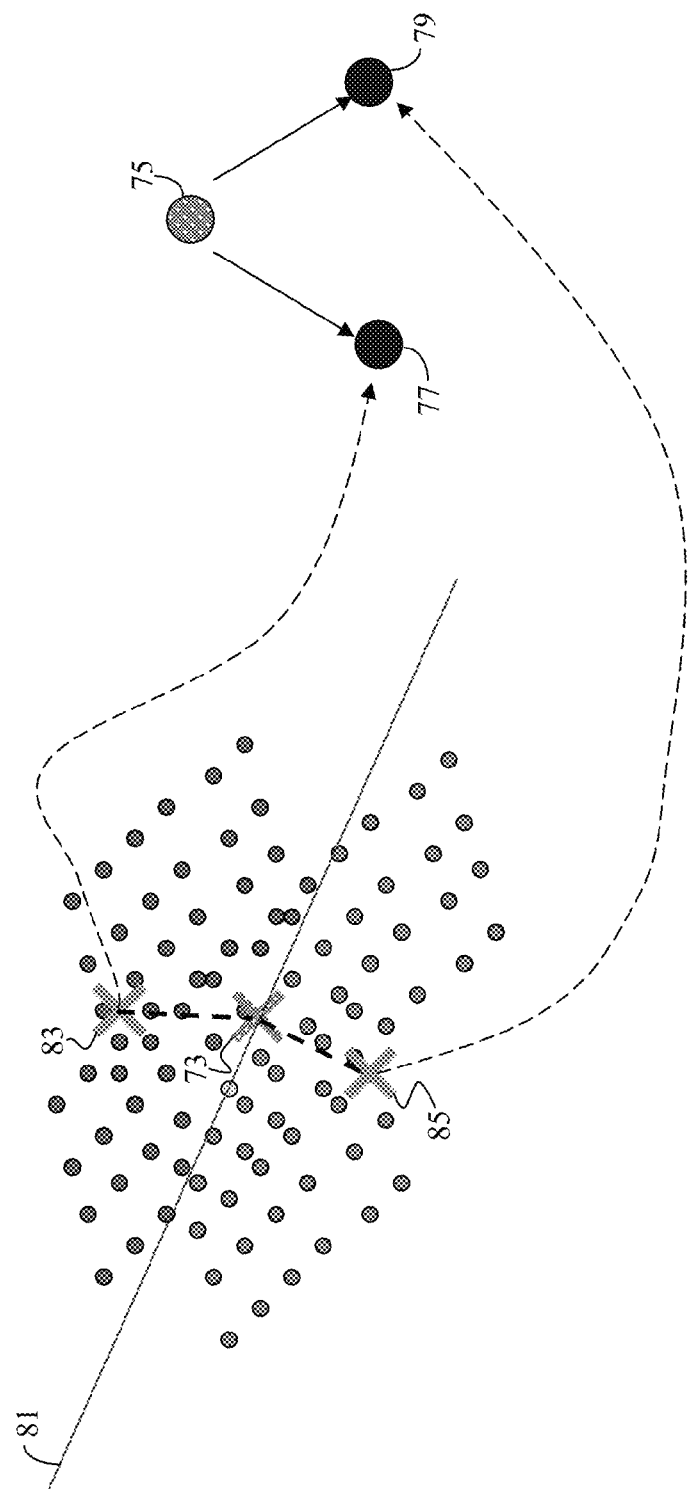

As is illustrated in FIG. 15, the item descriptor data is then split into two groups (for example two substantially equal groups) along mean point 73, as illustrated by dividing line 81. This creates two new center points 83 and 85 in the two newly created groups, respectively. As before, the two new center points 83 and 85 may be defined by the mean of their respective groups of data. Each of center points 83 and 85 may define respective child-nodes 77 and 79 under root node 75.

Figure 16:
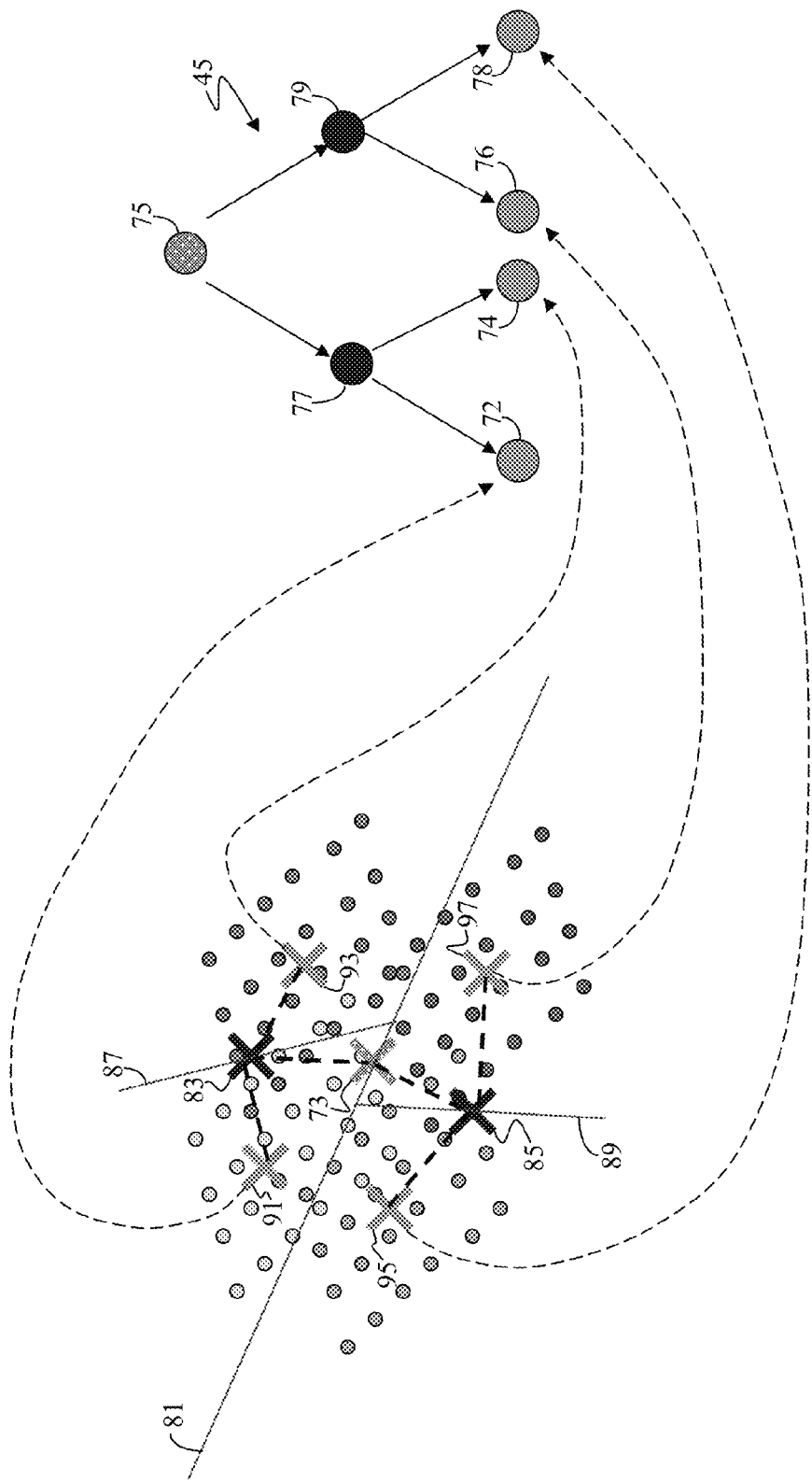

With reference to FIG. 16, each of these two groups may then be divided along their respective center points 83 and 85, as illustrated by dividing lines 87 and 89, respectively. This results in four newly created groups of data, each of which defines a new respective center point 91, 93, 95 and 97. As before, center points 91, 93, 95 and 97 may be defined by the mean of their respective group of data. Center points 91 and 93 may define child-nodes 72 and 74 under node 77 in hierarchical tree 45, and center points 95 and 97 may define child-nodes 76 and 78 under node 79 in hierarchical tree 45. It is to be understood that the data may continue to be divided to define additional child-nodes in simplified hierarchical tree 45. For example, each group of data may continue to be divided until the distance (i.e., the difference) between data within a group is not greater than a predefined maximum.

In a hierarchical tree structure, as it is known in the art, the root node is the top-most node in the hierarchical tree, a parent node is a node that has at least one other node below it and linked to it, a child node is a node linked to a parent node above it, and a leaf node is a node with no child nodes below it. A leaf node is effectively a bottom-most node along a link path (or branch path) downward from the root node. A node along a path downward from the root node to a leaf node may be termed a "path node" or an "intermediate node". Thus, in the example of simplified hierarchal tree 45, node 75 is the root node, nodes 77 and 79 are intermediate nodes (i.e., nodes linked to a parent node above them and linked to a child node below them), and nodes 72, 74, 76 and 68 are leaf nodes (i.e., nodes linked to a parent node above them, but with no child nodes below them).

When determining if an instance of a sought object may be found in an input image, feature points are extracted from the input (i.e. test) image in a similar manner as described above. These extracted feature points may be termed test feature points. The extracted test feature points may then be compared with sample feature points (i.e. training feature points) extracted from sample images (i.e. training images) of the sought object or a specific image selected for comparison. One example of how this may be done is if the extracted training feature points are arranged in a hierarchical tree structure as described above, and the extracted test feature pointes are then distributed into the existing hierarchical tree structure. By observing the distribution, or the clustering, of test feature points within hierarchical tree, one may discern if an instance of the sought object is indeed present. This might be done, fore example, be measuring the correlation between the test feature points and the training feature points within the hierarchical tree.

In the present invention, the feature point extraction and matching functions may be used to correlate (i.e. identify corresponding) feature points in two images of a common seen, as is illustrated in FIGS. 10-12.

It is to be understood that other methods of feature point extraction and correlation are known in the art, and they are likewise suitable for use in the present invention. The SIFT and ASIFT applications described above are provided as illustrations of feature point extraction and correspondence matching that may be used in a conjunction with the present invention. Other methods of feature point extraction and correspondence matching may likewise be used without deviating from the present invention.

The present invention is directed to a method and/or process and/or system and/or mechanism for using machine stereo vision to identify general objects, their sub-parts, and their relative positions within a 3D imaged environment. For illustration purposes, the present invention is presented as applied to the viewing, identifying and manipulating of wire harnesses, such as may be encountered on a manufacturing/assembly line (or conveyor belt), and particularly in a manufacturing line utilizing robotics for the manipulation of components. It is to be understood, however, that the present invention may be applied to the viewing, identifying and/or manipulating of any general object type, or object class, where machine stereo vision (i.e. stereo imaging) is used.

In the presently exemplary embodiment, a method of identifying wire harnesses in stereoscopic pair of images for manipulation is described. The present embodiment is applicable, for example, to robotic assembly lines using stereo imaging to identify wire harnesses, and other components, for assembly and/or manipulation.

When multiple wire harnesses (i.e. cables or other target object classes) appear in images of the same scene (i.e. the two images in a stereo image pair, for example), errors in correspondence matching may occur due to the similarity in shape of the different cables (particularly when more than one occurrence of the same wire harness type is in the image).

The present invention proposes improving correspondence matching by using local segmentation results and/or local connected components results as additional constraints. By using local results, outliers can be rejected more locally, and existing pixel correspondence (i.e. feature point correspondence) may be augmented and refined by (re)matching features (i.e. feature points) after image-level correspondence between cable components have been identified.

Thus, the present embodiment may be viewed as comprising two parts (or phases or sections). First, global homography is applied at the whole image level to a stereo image pair (i.e. two images that together comprise a stereo image pair). Second, local homography is applied to individual, corresponding pairs of objects (or connected components or segments) within the stereo image pair.

In the first part, image pairs are obtained by any of multiple stereo imaging techniques known in the art, such as still image cameras and/or video image cameras. Corresponding shapes (or segments or connected components) in the stereo image pairs are identified by means of global homography. That is, homography is applied to the entire image of each image in a stereo image pair. Shape structures in the images may be defined by segmentation and/or connected components (CC) sequences, and global homography permits one to identifying corresponding shapes (i.e. foreground object shapes) in the stereo image pairs. This identifies corresponding structures (or segments) in the stereo image pair.

In this first part, an image segmentation sequence identifies general shapes of foreground objects in an image. A connected components (CC) sequence is then applied to the segmented shapes to identify CC structures. Alternatively, a global connected components sequence may be applied to each image of a stereo image pair, omitting a preliminary segmentation sequence, to identify CC structures.

Feature points are then identified only for the identified CC structures, and a feature point matching sequence is applied. Feature points may be extracted and match in a manner similar to that use in SIFT applications. Global homography (i.e., homography at the whole image level) is then applied to the identify CC structures (or image segments) in each stereo image pair to identify corresponding CC structures in the stereo image pair. This global homography application also identifies extraneous CC structures (i.e. extraneous clusters of pixels) in each image of the stereo image pair for which a corresponding CC structure is not found in the other image of the stereo image pair. These extraneous clusters of pixels are preferably discarded.

In the second phase, local homography is applied to the pixels within each remaining pair of corresponding CC structures to further define and clean the corresponding CC structures (i.e. remove extraneous pixels). The general footprint (or shape) of each resultant (i.e. cleaned) CC structure is used as a starting point for determining a 3D shape of corresponding objects in the stereo image pairs.

Each general footprint of a cleaned CC structure may enclose pixels known to be part of the CC structure and pixels that are not identified as being part of any CC structure (i.e. they are "unknown" pixel(s) not connected to the cleaned CC structure within whose footprint the unknown pixel(s) resides). One of several methods is used to (re)establish correspondence between unknown pixels and known corresponding CC structures (including redefining a new set of feature points for the footprint shapes of each pair of corresponding CC structures). Local homography of the new set of matching pixels establishes 3D stereoscopic shapes that define corresponding 3D cloud views of objects common to the stereoscopic image pair.

The creation of CC structures may be optimized for wire harnesses by identifying the CC structures that have a generally elongated shape (i.e. defined by long wires) along the baseline of an image (i.e. along a predefined axis of the image), as is explained more fully below.

Figure 17:
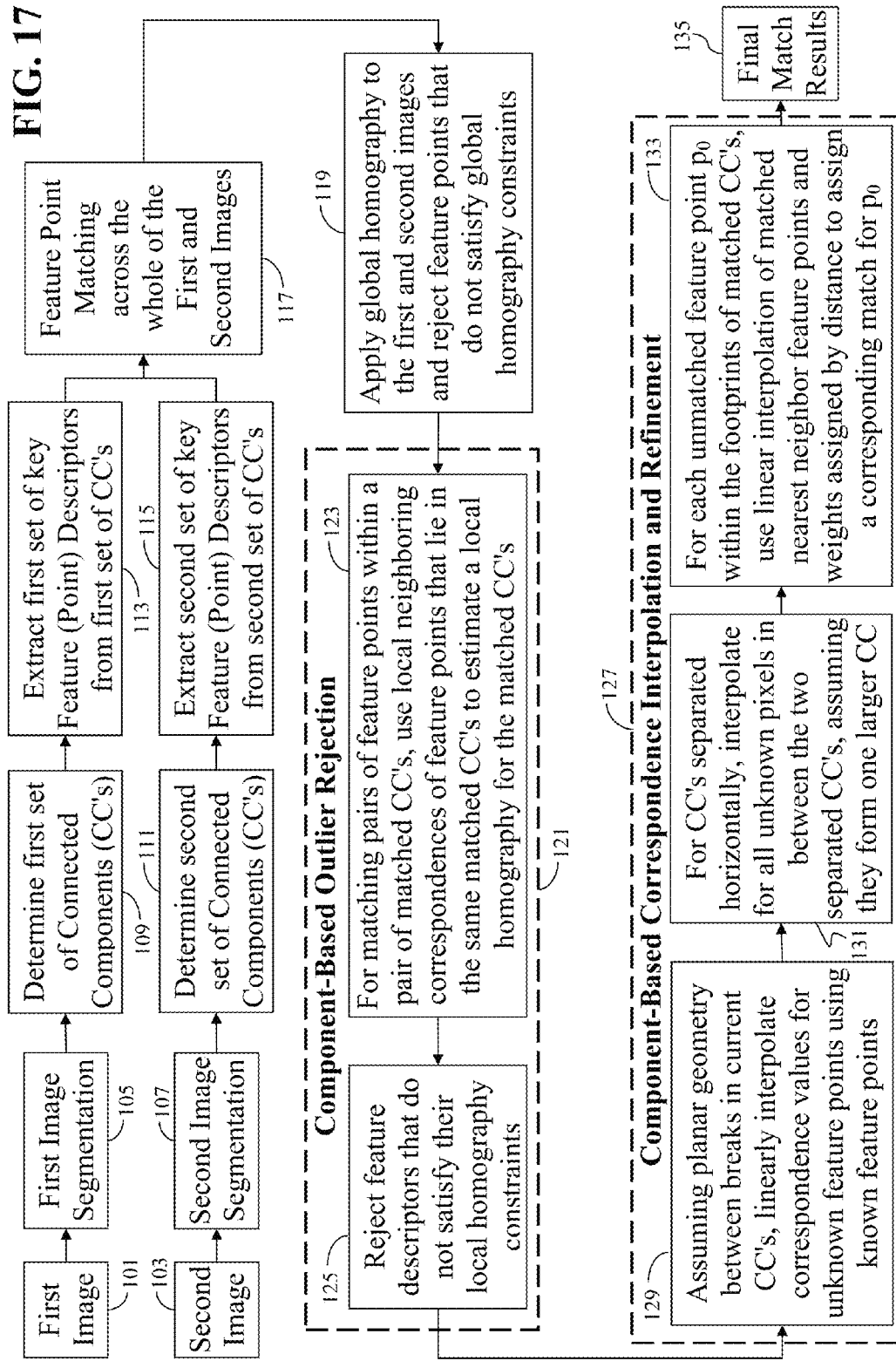
FIG. 17 is an overview of the presently preferred embodiment.

An overview of the presently preferred embodiment is shown in FIG. 17. For ease of explanation, the two images that characteristically make up a stereo image pair may herein be separately termed a "first" image and a "second" image. To identify corresponding objects, such as corresponding cable harnesses, in the first and second images of a stereoscopic pair of images, one first accesses (i.e. inputs, captures, fetches or otherwise acquires) the first image 101 and second image 103 of a stereo image pair.

Optionally, image segmentation may be separately applied to the first and second images, as is illustrated by first and second image segmentation blocks 105 and 107, respectively. Image segmentation may be achieved by a color based region growing method, by which regions of an image having substantially the same color (or light intensity or other defined visual characteristic) are grouped into a segment within the image. Alternatively, other image segmentation methods known in the art may be used, such as the image segmentation method recited in "Efficient Graph-Based Image Segmentation", P. Felzenszwalb et al, IJCV 2004, which is herein incorporated in its entirety by reference. Basically, block 105 segments the first image 101 into a first set of segments, where each segment in the first set of segments encompassing a unique portion of the first image 101 identified as having a predefined similar predominant image characteristic. Similarly, block 107 segments the second image 103 into a second set of segments, where each segment in the second set of segments encompassing a unique portion of the second image 103 identified as having a predefined similar predominant image characteristic.

A connected components application (tool, filter, sequence, etc.) may then be applied to each of the image segments identified in segmentation application. As it is known in the art, a connected components application typically identifies clusters of (preferably foreground) pixels that are connected to (or adjacent within a predefined pixel distance) each other, or within a maximum distance from each other and/or from an existing cluster of pixels. This is applied to both the first image and second image of each stereo image pair. Thus, block 109 determines a first set of connected components (CC) structures in first image 101, and block 101 determines a second set of connected components (CC) structures in second image 103.

An example of this is illustrated in FIG. 18. In the present example, image Img_1 may be the first or second image of a typical stereo image pair. In the present example, image Img_1 shows three separate cable harnesses 141, 143, and 145, whose general location within image Img_1 may be identified by image segmentation. If image segmentation is used, then a connected components sequence is applied to each of the image segments identified by the segmentation application. If image segmentation is not used, a connected components application is still applied to image Img_1, as a whole. Preferably, the connected components application identifies connected components (CC) structures of the foreground pixels within Imag_1. The connected components application results in distinct CC structures 141'', 143'' and 145'', which correspond to cable harnesses 141, 143, and 145, respectively. CC structures 141'', 143'' and 145'' together constitute a set of connected components (or set of CC structures) determined from image Img_1.

Block 113 then extracts (i.e. determines) a first set of feature descriptors (i.e. feature points) from the first set of connected components produced by block 109. That is, a feature descriptors extraction application is applied to the pixels identified as being part of the first set of CC structures. Preferably, feature extraction is applied only to pixels that are part of a CC structure. Similarly, block 115 extracts a second set of feature points from the second set of connected components determined by block 111. The feature points may be extracted using any suitable method known in the art, such as described above in reference to the SIFT application. Another example of a feature detector is the Features from Accelerated Segment Test, FAST, as is known in the art.

To further speed up this feature point extraction (i.e. feature detector) phase, CC structures that have relatively a long, slim shape (i.e. whose length is at least 4 times longer than its width) and whose length direction is substantially parallel to the baseline dimension of the image (i.e. parallel to the bottom dimension of the image) only extract feature points from the length-ends of the CC structure. That is, for connected components having a long, slim, strip shape and whose direction is substantially parallel to the baseline, only the end feature points of the connected component are extracted. Preferably, feature point extraction at each end of the length-ends is limited to not more than one-fourth the length of the CC structure. But if desired, feature points may also be extracted from the entirety of the CC structure, including the portion between the two length-ends. That is, all feature points within the footprint of the CC structure may be extracted, if desired.

Figure 19:
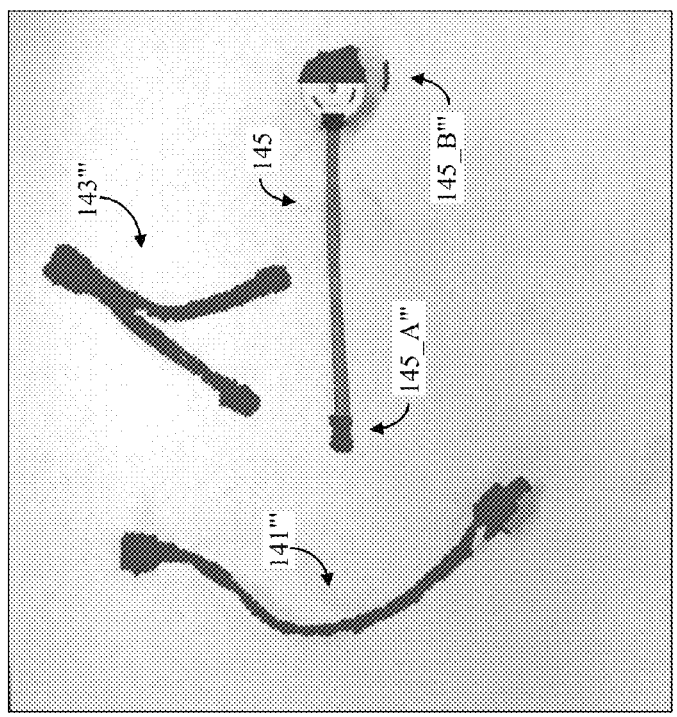
FIG. 19 illustrates the extraction of feature points from CC structures.

An example of feature point extraction in accord with a preferred embodiment of the present invention is illustrated in FIG. 19. Feature point extraction clusters 141''' and 143''' correspond to the whole of CC structures 141'' and 143'', as shown in FIG. 18. But CC structure 145'' of FIG. 18 is divided into two parts, its two length-ends and feature points are extracted only for the length-ends. A first set of length-end feature points 145_A''' are extracted for one end of cable harness 145, and a second set of length-end feature points 145_B''' are extracted for the opposite end of cable harness 145. If needed, feature points spanning from 145_A''' to 145_b''' may be later inferred by extrapolating a long segment feature points spanning from part 145_A'' to part 145_B''.

With the feature points of first and second images of the stereo image pair thus extracted, block 117 implements feature point matching across the whole of the first and second images. An example of feature matching is illustrated in FIG. 20.

Figure 20:
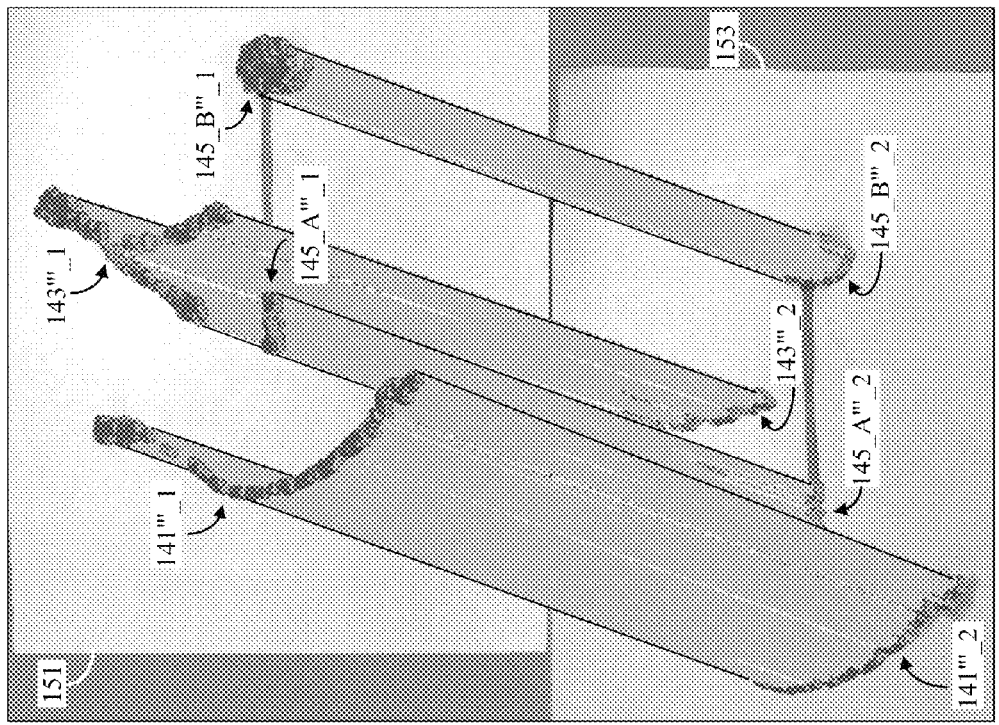
FIG. 20 illustrates the results of attempting to define correspondence between extracted feature points of a stereo image pair using global homography.

With reference to FIG. 20, a sample first image 151 is shown next to a sample second image 153 for illustration purposes. Some feature points clusters 141'''_1, 143'''_1, 145_A'''_1, 145'''_B_1, 147''' and 149''' are labeled for discussion purposes. Similarly, second image 153 shows feature point clusters 141'''_2, 143'''_2, 145_A'''_2, and 145'''_B_2. The correspondence between individual feature points is illustrated by connection lines spanning from first image 151 to second image 153 and coupling corresponding feature points. Shown some feature point clusters in an image (such as feature point clusters 147''' and 149''' in first image 151) do not have any corresponding feature points in the corresponding image of the stereo image pair (i.e. in second image 153). The illustrated connection lines also illustrate some erroneous correspondence between feature points of the first and second images. Thus, direct feature point matching results as shown to contain several wrong matching, which may be due to similarities of feature points across different cables, and cable harnesses.

To remove some of these errors, block 119 applies global homography to the first and second images and rejects feature points that do not satisfy global homography constraints. More specifically, global outlier rejection is done across the whole image using a homography prior with a large threshold, of preferably 20.

To further clean the matched (i.e. corresponding) feature points, block 121 applies component-based outlier rejection. Basically a local homography is established for each connected component (i.e. for each CC structure). Within each connected component, for each identified feature point correspondence, local neighboring correspondences that lie in the same connected component is used for estimating a local homography. It is then determined if the identified, corresponding feature points satisfy the local homography constraints. For example, for each matching pair of feature points within a pair of matched (i.e. corresponding) CC structures, block 123 uses local neighboring correspondences of feature points that lie in the same matched CC structures to estimate a local homography for matched CC structures.

Figure 21:
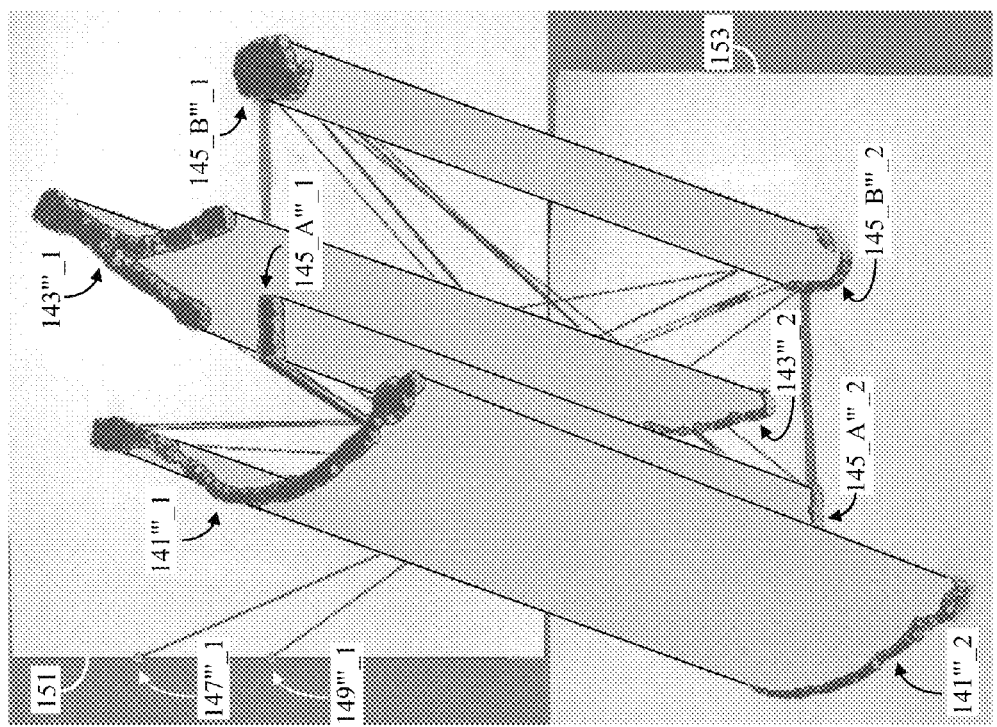
FIG. 21 illustrates the eliminating of erroneously coupled (i.e. established correspondence) feature points in the stereo image pair of FIG. 20 by using local homography at the CC structure level.

Block 125 then rejects any identified feature descriptors that do not satisfy their local homography constraints, which results in a cleaned correspondence between pairs of corresponding feature points, as is illustrated in FIG. 21, where all elements similar to those of FIG. 20 have similar reference characters and are described above.

The next step is implement component-based correspondence interpolation and refinement, as is indicated by block 127. This fills in gaps in feature points within connected component structures. That is, within the footprint of matched CC structure within a first image of a stereo pair, there may exist individual pixels (which may correspond to unmatched or unidentified feature points) that have not been matched to any pixel in the corresponding second image of the stereo pair. In block 129, for each current CC structure (i.e. CC structure that has not previously been discarded), assuming planar geometry between breaks in the CC structure, linearly interpolate correspondence values for unknown feature points using known feature points. That is, planar geometry for cable pieces in between known correspondence pixels is assumed. Correspondence values for unknown pixels (i.e. pixels in a first image that have no known correspondence with other pixels in a corresponding second image of a stereo image pair) is then linearly interpolated using known pixels.

Block 131 address the missing feature points between elongated connected components, wherein feature points from only the length-ends were previously extracted, is illustrated in FIG. 19, above. Basically, for horizontal cables, one interpolates for all unknown pixels in between the cable's two ends, assuming the whole cable is straight. That is, for CC structures separated horizontally (i.e. along a defined base line), one interpolates for all unknown pixels in between the two separated CC structures, assuming they form one larger, long CC structure.

Block 133 then implements linear interpolation for each unknown pixel $p_0$ to assign it a correspondence with another pixel in a corresponding image based on the known correspondence of matched pixels surrounding pixel $p_0$. For each unmatched pixel $p_0$, for which no correspondence has been found, find k (e.g. k=6) nearest pixel neighbors $p_{i(0=<i<k)}$ that have found correspondences $p'_{i(0=<i<k)}$. Thus neighbor pixels $p'_i$ are matched (i.e. known) pixels (i.e. pixels in a first image that are identified as having a matching pixel in a second image of a stereo image pair). For each neighbor pixel $p'_i$, compute a weight as $w_i=1.0/|p_0-p_i|$, where $p_0$ and $p_i$ refer to 2D image coordinates of the image within which they resign. In other words, the weight is the inverse of spatial distance from unknown pixel $p_0$ to its neighbor match (i.e. known) pixels. Correspondence is then interpolated for unknown pixel $p_0$, which converts it to a known pixel $p'_0$, using normalized weights, as follows:

$$p'_0 = \frac{\sum_{i=1}^{k} w_i p_i}{\sum_{i=1}^{k} w_i}$$

Basically, for each unmatched feature point $p_0$ within the footprints of matched CC structures, one uses linear interpolation of nearest neighbor matched feature points and weights assigned by distance to assign a corresponding match for $p_0$.

Alternatively, the problem of unmatched feature points within the footprint of matched CC structures may be address by running feature matching again between corresponding CC structures. Component correspondences may be identified by voting using the feature correspondences. One then re-runs the feature matching algorithm only in the corresponding connected component structures.

Figure 22:
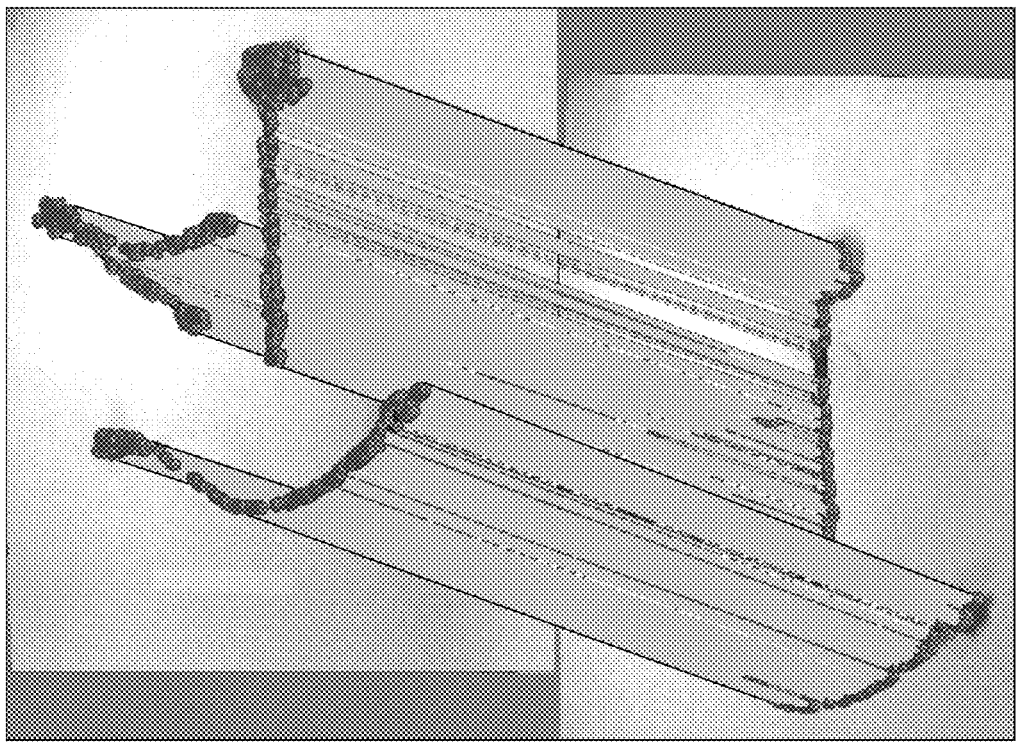
FIG. 22 illustrates a dense correspondence of feature points between stereo image pair achieved by identifying feature points at the local level (i.e. CC level) and establishing feature point correspondence using local homography.
Figure 23:
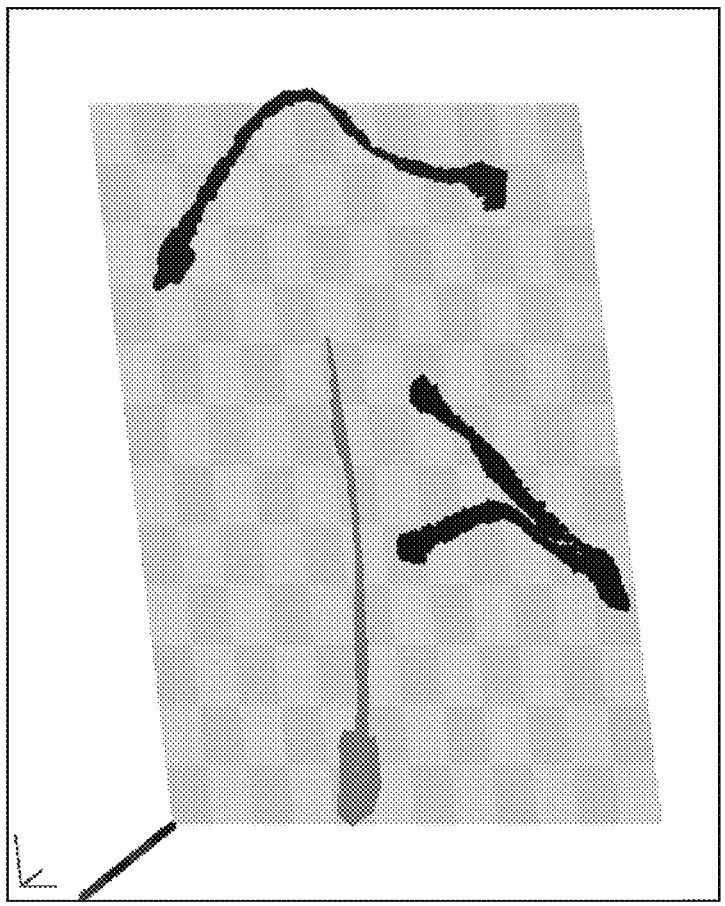
FIGS. 23 and 24 illustrate examples of dense 3D clouds of corresponding pixels in a stereo image pair achieved by the presently preferred embodiment.
Figure 24:
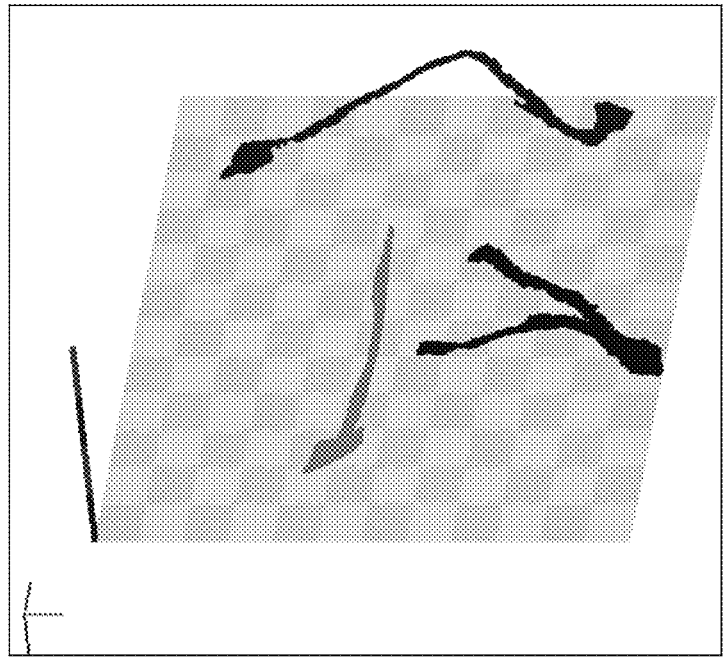

Irrespective of which method is used, the result is a clean and dense correspondence of feature points between the first and second images of a stereo image pair, as is illustrated in FIG. 22. This dense correspondence of matched feature points is the basis from which to construct a dense 3D cloud. That is, the dense correspondences are used for stereo triangulation, from which the 3D cloud is reconstructed. An example of final reconstructed 3D point cloud is illustrated in FIGS. 23 and 24.

With the 3D could thus constructed, and the feature points identified, the special distances and layout of the cable harnesses, or other target object, may be directly discerned for use in an automated sequence, such as robotic manipulation.

It is to be understood that the above-described method/process may be embodied in computer executable instructions stored in a non-transient storage medium, such as CD-rom, DVD, optical disk, flash drive, hard drive, solid state drive, floppy disk, magnetic memory, or other hardware type of computer memory storage.

It is further to be understood that the above invention may also be implementing in a computer-operated system, including a general purpose computer (or computing device) having a data processor, memory, input/output components, etc. The present invention may further be implanted in an application specific integrated circuit, asic, and/or a programmable data processing device, such as a programmable logic device (PLD), complex PLDs, programmable array logic (PAL), generic array logic (GAL), field programmable gate array (FPGA), etc.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of identifying corresponding objects in first and second images of a stereoscopic pair of images, said method comprising the following steps:

(a) determining a first set of connected components from said first image, and a second set of connected components from said second image;

(b) determining a first set of feature descriptors from said first set of connected components and a second set of feature descriptors from said second set of connected components;

(c) matching pairs of corresponding feature descriptors between the first and second sets of feature descriptors;

(d) applying global homography to said first and second images to reject matched pairs of corresponding feature descriptors that do not satisfy global homography constraints;

(e) for each pair of corresponding feature descriptors not rejected in step (d), applying local homography to the pair of corresponding feature descriptors in accordance to the pair's corresponding connected components, and rejecting any pair of corresponding feature descriptors that does not satisfy its local homography constraints, the remaining pairs of corresponding feature descriptors defining current connected components in their respective first and second images; and (f) within the footprints of each pair of corresponding current connected components, for each unknown pixel defined as a pixel not known as being a part of the connected component within whose footprint the unknown pixel resides, determining if a corresponding match for the unknown pixel can be identified in the corresponding paired current connected component, the matched pixels of each pair of current corresponding components identifying a corresponding object in said first and second images of said stereoscopic pair of images.

2. The method of claim 1, wherein step (a) includes:
segmenting said first image into a first set of segments, each segment in said first set of segments encompassing a unique portion of said first image having a similar predominant image characteristic;
segmenting said second image into a second set of segments, each segment in said second set of segments encompassing a unique portion of said second image having a similar predominant image characteristic;
said first set of connected components is determined by separately determining the connected components in each segment of said first set of segments; and
said second set of connected components is determined by separately determining the connected components in each segment of said second set of segments.

3. The method of claim 1, wherein in step (b), said first and second sets of feature descriptors are determined by means of a Features from Accelerated Segment Test, F.A.S.T. technique.

4. The method of claim 1, wherein in step (b), said feature descriptors are feature point descriptors.

5. The method of claim 1, wherein in step (b),
IF a connected component has an elongated shape with two opposing ends, and its orientation is substantially parallel to a reference base line;
THEN feature descriptors are determined only for the opposing endpoints of the elongated shape of said connected component;
ELSE feature descriptors are determined for the entirety of said connected component.

6. The method of claim 5, wherein said elongated shape is defined by an elongated length portion between said opposing ends, and a ratio of the width to the length of the elongated portion is not greater than 0.25.

7. The method of claim 1, wherein step (c) implements a hierarchical tree model based approach to matching corresponding feature descriptors.

8. The method of claim 1, wherein in step (d), global homography is applied by means of a homography prior routine with a threshold not smaller than predefined value.

9. The method of claim 8, wherein said predefined value is 20.

10. The method of claim 1, wherein in step (f), the measure of matching for an unknown pixel is interpolated from matching information of known pixels, said known pixels being pixels known to be a part of the same current connected component within which the unknown pixel resides.

11. The method of claim 10, wherein:
(I) in step (b):
IF a connected component has an elongated shape between a pair of two opposing ends, and its orientation substantially parallel to a reference base line;
THEN feature descriptors are determined only for the opposing endpoints of said connected component;
ELSE feature descriptors are determined for the entirety of said connected component; and
(II) in step (f), correspondence interpolation is applied by:
assuming a planar geometry for imaged objects in between known pairs of corresponding feature descriptors;
linearly interpolate correspondence values for unknown pixels using known pixels; and
for each pair of current connected components corresponding to a pair of said two opposing ends, interpolating for all unknown pixels in between the opposing ends, assuming a substantially straight shape.

12. The method of claim 10, wherein in step (f), correspondence interpolation is applied by:
for each unknown pixel, $p_0$:
(i) finding k nearest neighbors pixels $p_{i(0=<i<k)}$ that have known correspondences $p'_{i(0=<i<k)}$;
(ii) for each of said nearest neighbor pixels, computing a weight as $w_i=(1.0/|p_0-p_i|)$, where $p_0$ and $p_i$ are 2D image coordinates; and
(iii) interpolating correspondence for $p_0$ to define an interpolated known pixel $p'_0$ using normalized weights, as follows:

$$p'_0 = \frac{\sum_{i=1}^{k} w_i p'_i}{\sum_{i=1}^{k} w_i}$$

13. The method of claim 12, wherein k=6.

14. The method of claim 1, wherein in step (f), said measure of matching is determined by:
determining a new sets of feature descriptors for each pair of corresponding current connected components;
matching pairs of corresponding new feature descriptors within said new sets.

15. The method of claim 1, further including following step (f):
(g) using dense correspondence for stereo triangulation of the matched pixels to define a separate 3D cloud for each pair of current corresponding components, each separate 3D cloud also identifying corresponding objects in said first and second images of said stereoscopic pair of images.

16. The method of claim 1, wherein said corresponding objects are corresponding cable harnesses.

17. A non-transient memory storage medium encompassing computer-readable instructions executing the method of claim 1.

18. A computer-operated system identifying corresponding objects in first and second images of a stereoscopic pair of images, said system comprising:
an imaging device for generating said first and second images of a common scene; and
a computing device implementing the following steps:
(a) determining a first set of connected components from said first image, and a second set of connected components from said second image;
(b) determining a first set of feature descriptors from said first set of connected components and a second set of feature descriptors from said second set of connected components;
(c) matching pairs of corresponding feature descriptors between the first and second sets of feature descriptors;
(d) applying global homography to said first and second images to reject matched pairs of corresponding feature descriptors that do not satisfy global homography constraints;
(e) for each pair of corresponding feature descriptors not rejected in step (d), applying local homography to the pair of corresponding feature descriptors in accordance to the pair's corresponding connected components, and rejecting any pair of corresponding feature descriptors that does not satisfy its local homography constraints, the remaining pairs of corresponding feature descriptors defining current connected components in their respective first and second images; and (f) within the footprints of each pair of corresponding current connected components, for each unknown pixel defined as a pixel not known as being a part of the connected component within whose footprint the unknown pixel resides, determining if a corresponding match for the unknown pixel can be identified in the corresponding paired current connected component, the matched pixels of each pair of current corresponding components identifying a corresponding object in said first and second images of said stereoscopic pair of images.

19. The method of claim 18, wherein said computer-operated system is part of an assembly line, and said common scene is a predefined portion of said assembly line.

20. The method of claim 19, wherein said corresponding objects are cable harnesses.

* * * * *